(12) United States Patent
Chang et al.

(10) Patent No.: US 10,970,431 B2
(45) Date of Patent: Apr. 6, 2021

(54) AUTOMATED MODEL DEVELOPMENT PROCESS

(71) Applicant: EQUIFAX, INC., Atlanta, GA (US)

(72) Inventors: Vickey Chang, Suwanee, GA (US); Jeffrey Ouyang, Atlanta, GA (US); Wei Zhang, Alpharetta, GA (US)

(73) Assignee: EQUIFAX INC., Atlanta, GA (US)

( * ) Notice: Subject to any disclaimer, the term of this patent is extended or adjusted under 35 U.S.C. 154(b) by 808 days.

(21) Appl. No.: 15/560,394

(22) PCT Filed: Apr. 8, 2016

(86) PCT No.: PCT/US2016/026582
§ 371 (c)(1),
(2) Date: Sep. 21, 2017

(87) PCT Pub. No.: WO2016/164680
PCT Pub. Date: Oct. 13, 2016

(65) Prior Publication Data
US 2018/0075175 A1    Mar. 15, 2018

Related U.S. Application Data

(60) Provisional application No. 62/145,100, filed on Apr. 9, 2015.

(51) Int. Cl.
*G06F 30/20* (2020.01)
*G06F 17/18* (2006.01)
(Continued)

(52) U.S. Cl.
CPC .............. *G06F 30/20* (2020.01); *G06F 17/18* (2013.01); *G06Q 40/025* (2013.01); *G06Q 10/067* (2013.01)

(58) Field of Classification Search
None
See application file for complete search history.

(56) References Cited

U.S. PATENT DOCUMENTS 7,480,640 B1 * 1/2009 Elad ........................ G06Q 10/10
706/14
2003/0212678 A1 * 11/2003 Bloom .................. G06F 16/285
(Continued)

OTHER PUBLICATIONS

Mamdouh Refaat, "Data preparation for data mining using SAS," 2007, Morgan Kaufman Publishers, 192 pages (Year: 2007).*
(Continued)

*Primary Examiner* — Kamini S Shah
*Assistant Examiner* — Russ Guill
(74) *Attorney, Agent, or Firm* — Kilpatrick Townsend & Stockton LLP

(57) ABSTRACT

An automated model development tool can be used for automatically developing a model (e.g., an analytical model). The automated model development tool can perform various automated operations for automatically developing the model including, for example, performing automated operations on variables in a data set that can be used to develop the model. The automated operations can include automatically analyzing the predictor variables. The automated operations can also include automatically binning (e.g., combining) data associated with the predictor variables to provide monotonicity between the predictor variables and one or more output variables. The automated operations can further include automatically reducing the number of predictor variables in the data set and using the reduced number of predictor variables to develop the analytical model. The model developed using the automated model development tool can be used to identify relationships between predictor variables and one or more output variables in various machine learning applications.

20 Claims, 20 Drawing Sheets

(51) Int. Cl.
*G06Q 40/02* (2012.01)
*G06Q 10/06* (2012.01)

(56) References Cited

U.S. PATENT DOCUMENTS

| | | | | |
|---|---|---|---|---|
| 2006/0161403 | A1* | 7/2006 | Jiang | G06N 20/00 703/2 |
| 2006/0241923 | A1* | 10/2006 | Xu | G06K 9/6217 703/2 |
| 2008/0279434 | A1* | 11/2008 | Cassill | G06Q 10/06 382/131 |
| 2010/0010878 | A1* | 1/2010 | Pinto | G06F 30/00 705/7.31 |
| 2011/0071956 | A1* | 3/2011 | Pinto | G06F 30/00 705/348 |
| 2011/0125671 | A1* | 5/2011 | Zhang | G06Q 40/06 705/36 R |
| 2012/0197608 | A1* | 8/2012 | Pinto | G06Q 10/04 703/2 |
| 2014/0100916 | A1* | 4/2014 | Li | G06Q 30/02 705/7.31 |
| 2014/0337170 | A1 | 11/2014 | Bloomquist et al. | |
| 2015/0261846 | A1* | 9/2015 | Hall | G06F 16/2425 707/738 |

OTHER PUBLICATIONS

Kattamuri S. Samna, "Predictive modeling with SAS enterprise miner," 2013, SAS Institute, 138 pages (Year: 2013).*
Raymond Anderson, "The credit scoring toolkit," 2007, Oxford University Press, 6 pages (Year: 2007).*
Sarah Boslaugh et al., "Statistics in a nutshell," 2008, O'Reilly, 478 pages (Year: 2008).*
"Multiple Regression," 2012, https://oak.ucc.nau.edu/rh232/courses/EPS625/Handouts/Regression/Multiple Regression - Handout.pdf, 8 pages (Year: 2012).*
Sandra Paterlini et al., "Regression model selection using genetic algorithms," 2010, NN'10/EC'10/FS'10: Proceedings of the 11th WSEAS international conference on neural networks, 9 pages (Year: 2010).*
R. Man, "Survival analysis in credit scoring," 2014, Rabobank International, 83 pages (Year: 2014).*
International Patent Application No. PCT/US2016/026582, International Search Report and Written Opinion, dated Dec. 9, 2016, 8 pages.
Schulz et al., "Automated Valuation Modelling: A Specification Exercise", 2013, 42 pages.
AU2016245868, "First Examination Report", dated Aug. 26, 2020, 4 pages.

* cited by examiner

| bal3 | xmin | xmax | pval | QP | pval_max |
|---|---|---|---|---|---|
| 1 | 0 | 0 | 0 | | 0.000 |
| 2 | 1 | 221 | 0.18 | 1.798 | 0.180 |
| 3 | 222 | 570 | 0 | 24.580 | 0.180 |
| 4 | 571 | 1,110 | 0.014 | 5.977 | 0.180 |
| 5 | 1,111 | 2,054 | 0.033 | 4.522 | 0.180 |
| 6 | 2,055 | 3,378 | 0.026 | 4.948 | 0.180 |
| 7 | 3,380 | 5,278 | 0.001 | 10.717 | 0.180 |
| 8 | 5,279 | 7,723 | 0.964 | 0.002 | 0.964 |
| 9 | 7,724 | 10,444 | 0.196 | 1.674 | 0.964 |
| 10 | 10,445 | 13,680 | 0 | 38.670 | 0.964 |
| 11 | 13,684 | 17,352 | 0 | 51.315 | 0.964 |
| 12 | 17,354 | 21,946 | 0.646 | 0.211 | 0.964 |
| 13 | 21,947 | 28,480 | 0.249 | 1.331 | 0.964 |
| 14 | 28,484 | 37,529 | 0.662 | 0.191 | 0.964 |
| 15 | 37,535 | 54,872 | 0.317 | 1.000 | 0.964 |
| 16 | 54,912 | 98,870 | 0.57 | 0.323 | 0.964 |
| 17 | 98,873 | 2,369,552 | 0.424 | 0.639 | 0.964 |

FIG. 5

| 508 → bal3 | xmin | xmax | pval | QP ← 602 | pval_max |
|---|---|---|---|---|---|
| 1 | 0 | 0 | 0 | | 0.000 |
| 2 | 1 | 221 | 0.18 | 1.798 | 0.180 |
| 3 | 222 | 570 | 0 | 24.580 | 0.180 |
| 4 | 571 | 1,110 | 0.014 | 5.977 | 0.180 |
| 5 | 1,111 | 2,054 | 0.033 | 4.522 | 0.180 |
| 6 | 2,055 | 3,378 | 0.026 | 4.948 | 0.180 |
| 604 → 7 | 3,380 | 7,723 | 2E-04 | 13.685 | 0.180 |
| 8 | 7,724 | 10,444 | 0.14 | 2.176 | 0.180 |
| 9 | 10,445 | 13,680 | 0 | 38.670 | 0.180 |
| 606 → 10 | 13,684 | 17,352 | 0 | 51.315 | 0.180 |
| 608 → 11 | 17,354 | 21,946 | 0.646 | 0.211 | 0.646 |
| 12 | 21,947 | 28,480 | 0.249 | 1.331 | 0.646 |
| 13 | 28,484 | 37,529 | 0.662 | 0.191 | 0.662 |
| 14 | 37,535 | 54,872 | 0.317 | 1.000 | 0.662 |
| 15 | 54,912 | 98,870 | 0.57 | 0.323 | 0.662 |
| 16 | 98,873 | 2,369,552 | 0.424 | 0.639 | 0.662 |

FIG. 6

| obs | xmin | xmax | n | pval | QP | pval_max |
|---|---|---|---|---|---|---|
| 1 | 1 | 0 | 1,906 | 0.000 | | 0.000 |
| 2 | 2 | 221 | 1,241 | 0.180 | 1.798 | 0.180 |
| 3 | 222 | 570 | 1,235 | 0.000 | 24.580 | 0.180 |
| 4 | 571 | 1,110 | 1,234 | 0.014 | 5.977 | 0.180 |
| 5 | 1,111 | 2,054 | 1,233 | 0.033 | 4.522 | 0.180 |
| 6 | 2,055 | 3,378 | 1,232 | 0.026 | 4.948 | 0.180 |
| 7 | 3,380 | 7,723 | 2,466 | 0.000 | 13.685 | 0.180 |
| 8 | 7,724 | 10,444 | 1,232 | 0.140 | 2.176 | 0.180 |
| 9 | 10,445 | 13,680 | 4,642 | 0.000 | 38.670 | 0.180 |
| 10 | 13,684 | 21,946 | 2,465 | 0.000 | 93.569 | 0.180 |
| 11 | 21,947 | 2,369,552 | 5,748 | 0.181 | 1.791 | 0.181 |

FIG. 7

| bal3 | scorr | loindvar | hiindvar | bad_rate | odds_index | odds_diff | odds_max |
|---|---|---|---|---|---|---|---|
| 1 | 0.106 | 0 | 0 | 0.076 | 3.449 | 0.000 | 0.000 |
| 2 | 0.106 | 1 | 221 | 0.089 | 2.891 | -0.558 | 0.000 |
| 3 | 0.106 | 222 | 570 | 0.155 | 1.552 | -1.339 | 0.000 |
| 4 | 0.106 | 571 | 1,110 | 0.121 | 2.068 | 0.516 | 0.516 |
| 5 | 0.106 | 1,111 | 2,054 | 0.150 | 1.609 | -0.459 | 0.516 |
| 6 | 0.106 | 2,055 | 3,378 | 0.183 | 1.264 | -0.345 | 0.516 |
| 7 | 0.106 | 3,380 | 7,723 | 0.237 | -1.093 | -2.357 | 0.516 |
| 8 | 0.106 | 7,724 | 10,444 | 0.259 | -1.230 | -0.138 | 0.516 |
| 9 | 0.106 | 10,445 | 13,680 | 0.353 | -1.920 | -0.690 | 0.516 |
| 10 | 0.106 | 13,684 | 21,946 | 0.241 | -1.118 | 0.802 | 0.802 |
| 11 | 0.106 | 21,947 | 2,369,552 | 0.227 | -1.036 | 0.082 | 0.802 |

FIG. 10

| Obs | bal3 | # Total | % of Total | bad Rate | Odds Index |
|---|---|---|---|---|---|
| 1 | 0 TO 0 | 1,906 | 0.077 | 7.61% | 3.450 |
| 2 | 1 TO 221 | 1,241 | 0.050 | 8.94% | 2.890 |
| 3 | 222 TO 1110 | 2,469 | 0.100 | 13.77% | 1.780 |
| 4 | 1111 TO 2054 | 1,233 | 0.050 | 15.00% | 1.610 |
| 5 | 2055 TO 3378 | 1,232 | 0.050 | 18.34% | 1.260 |
| 6 | 3380 TO 7723 | 2,466 | 0.100 | 23.68% | -1.090 |
| 7 | 7724 TO 10444 | 1,232 | 0.050 | 25.89% | -1.230 |
| 8 | 10445 TO 2368552 | 12,855 | 0.522 | 27.53% | -1.340 |
|  |  | 24634 |  |  |  |

FIG. 11

| Obs | VARIABLE | KS | GINI | INFOVALUE | DIVERGENCE | NO | NoMissing | Per_miss | MIN | MAX | MEAN | MEDIAN |
|---|---|---|---|---|---|---|---|---|---|---|---|---|
| 1 | ioldest | 12.04 | 21.6527 | 0.1647 | 0.1205 | 20113 | 4521 | 0.18353 | 0 | 484 | 128.12 | 131.00 | ioldest - 3116 - AGE OLDEST INSTALLMENT TRD

| Obs | VARIABLE | #TOTAL | %OF TOTAL | #OF BADS | %OF BADS | #OF GOODS | %OF GOODS | BAD RATE | ChiSq | P-VALUE | ODDS INDEX | ODDS INDEX CHART |
|---|---|---|---|---|---|---|---|---|---|---|---|---|
| 1 | MISSING | 4,521 | 18.35% | 741 | 13.60% | 3,780 | 19.70% | 16.39% | 67.10 | 0.0000 | 1.45 | 1.45 |
| 2 | 0 TO 26 | 1,195 | 4.85% | 354 | 6.50% | 841 | 4.38% | 29.62% | 30.42 | 0.0000 | -1.48 | -1.48 * |
| 3 | 27 TO 48 | 1,302 | 5.29% | 432 | 7.93% | 870 | 4.53% | 33.18% | 72.00 | 0.0000 | -1.75 | -1.75 * |
| 4 | 49 TO 67 | 1,271 | 5.16% | 450 | 8.26% | 821 | 4.28% | 35.41% | 101.42 | 0.0000 | -1.93 | -1.93 * |
| 5 | 68 TO 85 | 1,221 | 4.96% | 412 | 7.56% | 809 | 4.22% | 33.74% | 74.57 | 0.0000 | -1.79 | -1.79 * |
| 6 | 86 TO 99 | 1,203 | 4.88% | 363 | 6.66% | 840 | 4.38% | 30.17% | 35.28 | 0.0000 | -1.52 | -1.52 * |
| 7 | 100 TO 111 | 1,258 | 5.11% | 342 | 6.28% | 916 | 4.77% | 27.19% | 14.60 | 0.0001 | -1.31 | -1.31 * |
| 8 | 112 TO 122 | 1,369 | 5.56% | 352 | 6.46% | 1,017 | 5.30% | 25.71% | 7.99 | 0.0047 | -1.22 | -1.22 * |
| 9 | 123 TO 131 | 1,346 | 5.46% | 293 | 5.38% | 1,053 | 5.49% | 21.77% | 0.08 | 0.7839 | 1.02 | 1.02 |
| 10 | 132 TO 138 | 1,254 | 5.09% | 273 | 5.01% | 981 | 5.11% | 21.77% | 0.07 | 0.7924 | 1.02 | 1.02 |
| 11 | 139 TO 145 | 1,374 | 5.58% | 254 | 4.66% | 1,120 | 5.84% | 18.49% | 8.20 | 0.0042 | 1.25 | 1.25 * |
| 12 | 146 TO 152 | 1,372 | 5.57% | 208 | 3.82% | 1,164 | 6.07% | 15.16% | 30.04 | 0.0000 | 1.59 | 1.59 * |
| 13 | 153 TO 163 | 1,340 | 5.44% | 249 | 4.57% | 1,091 | 5.69% | 18.58% | 7.58 | 0.0059 | 1.24 | 1.24 * |
| 14 | 164 TO 180 | 1,315 | 5.34% | 255 | 4.68% | 1,060 | 5.53% | 19.39% | 4.42 | 0.0354 | 1.18 | 1.18 * |
| 15 | 181 TO 205 | 1,228 | 4.98% | 206 | 3.78% | 1,022 | 5.33% | 16.78% | 15.86 | 0.0001 | 1.41 | 1.41 * |
| 16 | 206 TO 251 | 1,335 | 5.42% | 157 | 2.88% | 1,178 | 6.14% | 11.76% | 64.77 | 0.0000 | 2.13 | 2.13 * |
| 17 | 252 TO 484 | 730 | 2.96% | 108 | 1.98% | 622 | 3.24% | 14.79% | 17.71 | 0.0000 | 1.64 | 1.64 * |
|  |  | 24,634 |  | 5,449 |  | 19,185 |  |  |  |  |  |  |

FIG. 13A

| Obs | B1 | #TOTAL | % OF TOTAL | BAD RATE | ODDS INDEX CHART | MISS A | MISS B | MISS C | MISS Z |
|---|---|---|---|---|---|---|---|---|---|
| 1 | MISS A | 4291 | 4.47% | 50.48% | * | | | | |
| 2 | MISS B | 21967 | 22.90% | 49.38% | -2.35 * | | | | |
| 3 | MISS C | 2137 | 2.23% | 24.71% | -2.25 * | | | | |
| 4 | MISS Z | 18402 | 19.18% | 26.37% | 1.32 * | | | | |
|   |        |       |        |        | 1.21 * | 0.15 | 0.05 | 3.52 | 3.41 |
| 5 | 0 TO 0 | 10373 | 10.81% | 48.89% | -2.20 * | 3.77 | 3.67 | 0.1 | 0.21 |
| 6 | 1 TO 1 | 12395 | 12.92% | 23.46% | 1.42 * | 5.05 | 4.95 | 1.38 | 1.49 |
| 7 | 2 TO 3 | 10757 | 11.21% | 13.84% | 2.70 * | 6.71 | 6.61 | 3.04 | 3.15 |
| 8 | 4 TO 5 | 6215 | 6.48% | 9.04% | 4.36 * | 8.43 | 8.33 | 4.76 | 4.87 |
| 9 | 6 TO 9 | 6306 | 6.57% | 6.66% | 6.08 * | 9.21 | 9.11 | 5.54 | 5.65 |
| 10 | 10 TO 34 | 3095 | 3.23% | 5.95% | 6.86 * | | | | |
|    |       | 95938 |        |        |   |   |   |   |   |

AUTOMODEL, KS = 67.50

| | | | | | |
|---|---|---|---|---|---|
| INTERCEPT | 1 | -1.8925 | 0.2795 | 45.8418 | <.0001 | |
| clu_inv | 1 | 0.9582 | 0.0681 | 198.1627 | <.0001 | Y |
| utlbop3 | 1 | -0.8269 | 0.0673 | 151.0017 | <.0001 | Y |
| bg03_sqrt | 1 | -0.231 | 0.0195 | 139.6951 | <.0001 | Y |
| wst26_d2 | 1 | -0.5343 | 0.046 | 134.8658 | <.0001 | Y |
| pct2asat_sq | 1 | 0.7489 | 0.065 | 132.7893 | <.0001 | Y |
| iq3 | 1 | -0.1672 | 0.0172 | 94.1441 | <.0001 | Y |
| x524 | 1 | -0.0327 | 0.00348 | 88.4545 | <.0001 | Y |
| xwstr1 | 1 | -0.2784 | 0.0306 | 82.7155 | <.0001 | Y |
| wst53_d2 | 1 | -0.75 | 0.0849 | 78.0051 | <.0001 | Y |
| wst43_inv | 1 | 2.0525 | 0.2484 | 68.2724 | <.0001 | Y |
| bbal3c | 1 | 0.00004 | -4.65E-06 | 65.9096 | <.0001 | Y |
| pct2awst7_d5 | 1 | -0.7346 | 0.0944 | 60.5521 | <.0001 | Y |

FIG. 17A

MANUAL QnD, KS = 66.05 ← 1704

| PARAMETER | DF | ESTIMATE | STANDARD ERROR | WALD CHI-SQUARE | Pr>ChiSq | STANDARDIZED ESTIMATE |
|---|---|---|---|---|---|---|
| INTERCEPT | 1 | 1.1746 | 0.0564 | 434.2016 | <.0001 | -0.2624 |
| clu | 1 | -0.2059 | 0.00936 | 483.5894 | <.0001 | -0.1775 |
| pd | 1 | -0.2932 | 0.0163 | 322.5331 | <.0001 | -0.1505 |
| pmiop3 | 1 | -0.6362 | 0.0416 | 233.8148 | <.0001 | 0.1446 |
| clmup | 1 | 0.1575 | 0.0107 | 215.7215 | <.0001 | 0.1409 |
| oldest | 1 | 0.002 | 0.000145 | 188.9468 | <.0001 | -0.0808 |
| bbal3c | 1 | -0.00005 | 3.87E-06 | 161.9017 | <.0001 | 0.1298 |
| dtd2td | 1 | 1.0932 | 0.092 | 141.2101 | <.0001 | 0.1293 |
| vsatpct | 1 | 0.6087 | 0.0525 | 134.5477 | <.0001 | 0.1217 |
| wst7 | 1 | 0.1085 | 0.0095 | 130.5134 | <.0001 | 0.1071 |
| utlvop3 | 1 | -0.6163 | 0.0588 | 109.8309 | <.0001 | -0.1108 |

FIG. 17B

AUTOMATED MODEL DEVELOPMENT PROCESS

CROSS-REFERENCE TO RELATED APPLICATIONS

This is a U.S. national phase under 35 U.S.C. 371 of International Patent Application No. PCT/US2016/026582, titled "Automated Model Development Process" and filed Apr. 8, 2016, which claims priority to U.S. Provisional Application No. 62/145,100, entitled "Automated Model Development Tool," filed Apr. 9, 2015, the entirety of each of which is hereby incorporated by reference herein.

TECHNICAL FIELD

The present disclosure relates generally to computer-implemented systems and methods for obtaining data from a database and emulating intelligence to develop an analytical model. More specifically, but not by way of limitation, this disclosure relates to an automated model development tool for automatically developing an analytical model using various algorithms, such as, for example, a genetic algorithm.

BACKGROUND

An analytical model is a model that includes various equations and complex algorithms that can be used to identify, describe, or express relationships among one or more variables in a data set. The analytical model can also be used to estimate or classify data in the data set. In certain applications, the analytical model can be used to recognize patterns in the input data set and make predictions based on such patterns. Generally, it may be difficult to manually develop complex algorithms for developing an analytical model.

For example, developing an accurate analytical model can include developing the analytical model using a large input data set (e.g., in the order of gigabytes or terabytes), which may be difficult to format or manipulate manually. Moreover, developing the analytical model can include precisely selecting the input data set to be used to develop the analytical model and precisely formatting the data set such that the analytical model can be used for a particular purpose. Furthermore, the various algorithms used to develop the analytical model may need to be calibrated such that the model can be used to identify certain patterns in the input data set and make accurate predictions for the particular purpose based on such patterns.

BRIEF SUMMARY OF THE INVENTION

Various embodiments of the present disclosure provide systems and methods for an automated model development tool that can be used for automatically generating, modifying, selecting, or otherwise developing one or more analytical models. These analytical models can be used for identifying relationships between sets of predictor variables and one or more output variables in various machine learning applications.

For example, a computing system can receive a data set with multiple predictor variables. The computing system can determine a type for one or more of the predictor variables, which can allow for selecting a parameter for developing an analytical model using the data set. The type of the predictor variable includes a numeric type or a character type. The computing system can increase a predictive strength of at least some of the predictor variables having the determined type by combining data associated with at least some of the predictor variables based on a similarity between the data. The computing system can reduce a number of predictor variables in the data set by selecting a subset of the predictor variables based on the predictive strength of each predictor variable in the subset. The computing system can develop the analytical model based on the combined data of the selected subset of the predictor variables. The analytical model can be used to determine a relationship among the predictor variables and an output variable.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

FIG. 5 is a table depicting an example of automatically binning data associated with a predictor variable to combine data associated with the predictor variable in the process of FIG. 4, according to certain aspects of the present disclosure.

FIG. 6 is a table depicting another example of automatically binning data associated with a predictor variable to combine data associated with the predictor variable in the process of FIG. 4, according to certain aspects of the present disclosure.

FIG. 7 is a table depicting an example of data associated with the automatic binning operations of FIGS. 5 and 6, according to certain aspects of the present disclosure.

FIG. 10 is a table depicting another example of automatically smoothing various bins of a predictor variable using the automatic binning module of FIG. 3, according to certain aspects of the present disclosure.

FIG. 11 is a table depicting an example of a neutral group creation operation using the automatic binning module of FIG. 3, according to certain aspects of the present disclosure.

Figure 3:
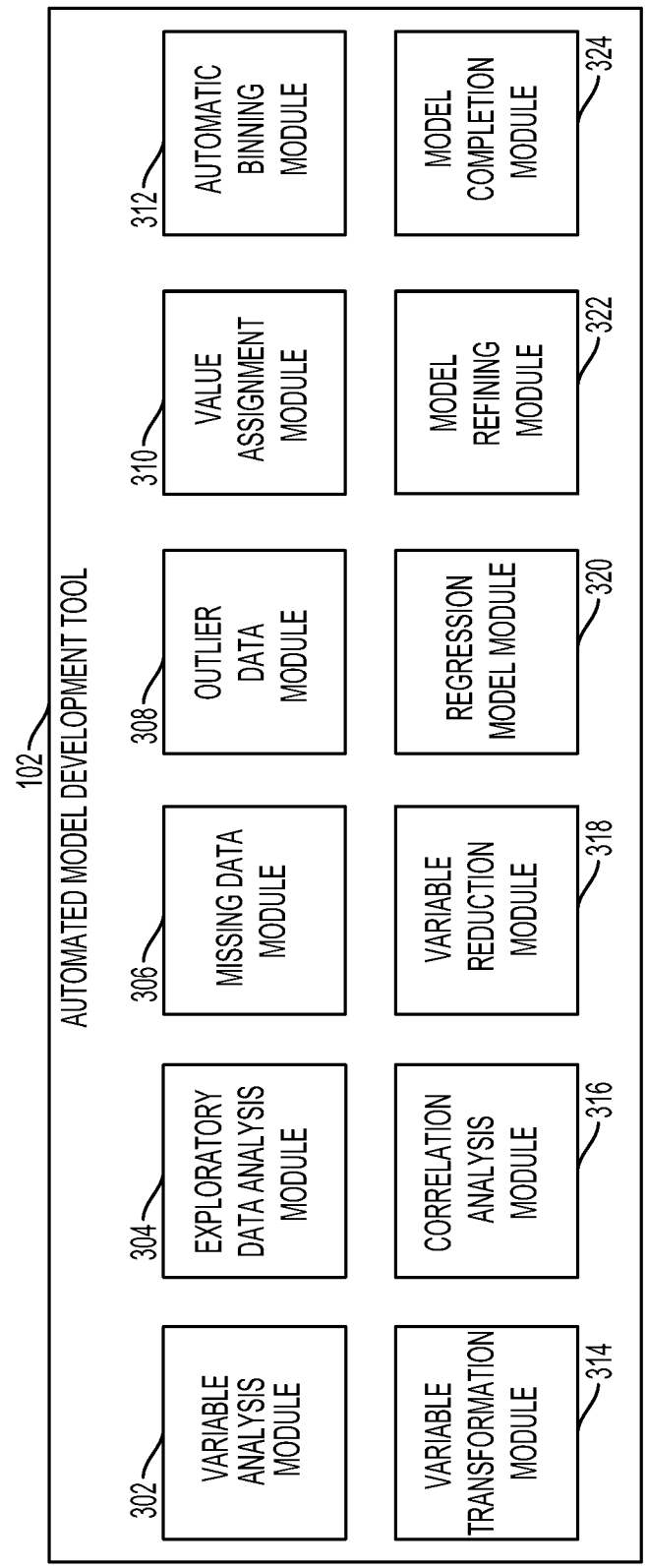
FIG. 3 is a block diagram depicting an example of the automated model development tool of FIG. 1, according to certain aspects of the present disclosure.
Figure 13B:
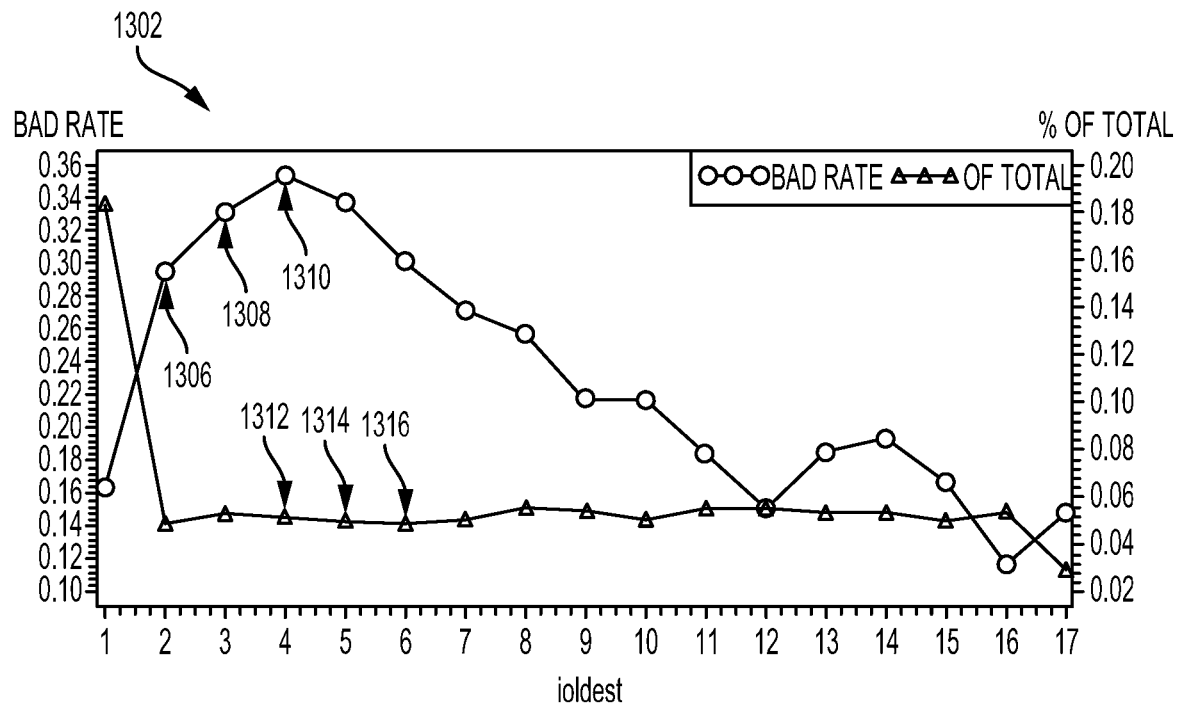
Figure 13C:
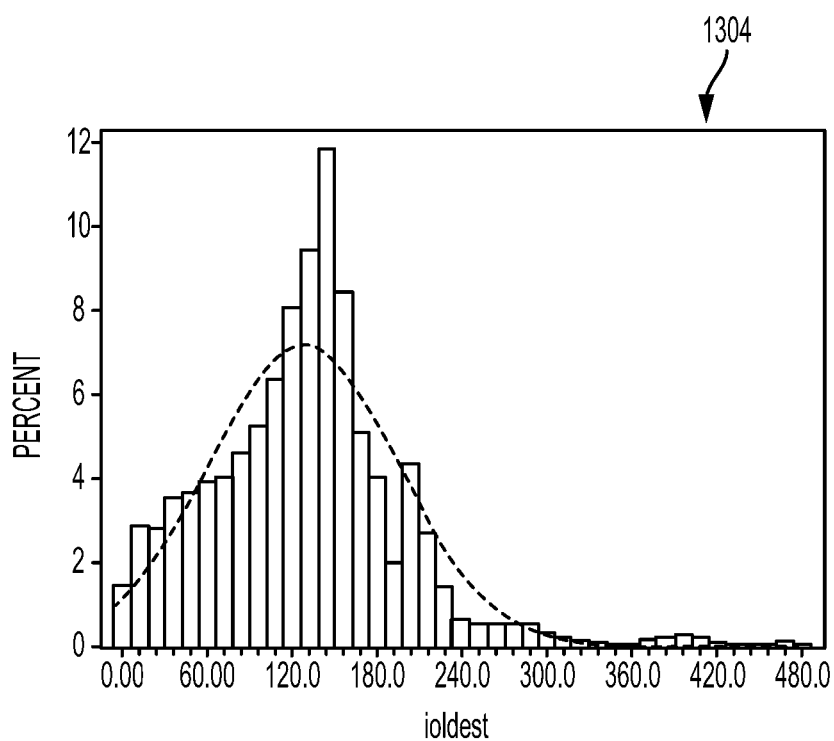

FIGS. 13A-C are diagrams depicting examples of data that can be output using an exploratory data analysis module of FIG. 3, according to certain aspects the present disclosure.

FIG. 14 is a table depicting an example of automatically assigning missing values associated with a predictor variable using a value assignment module of FIG. 3, according to certain aspects of the present disclosure.

Figure 4:
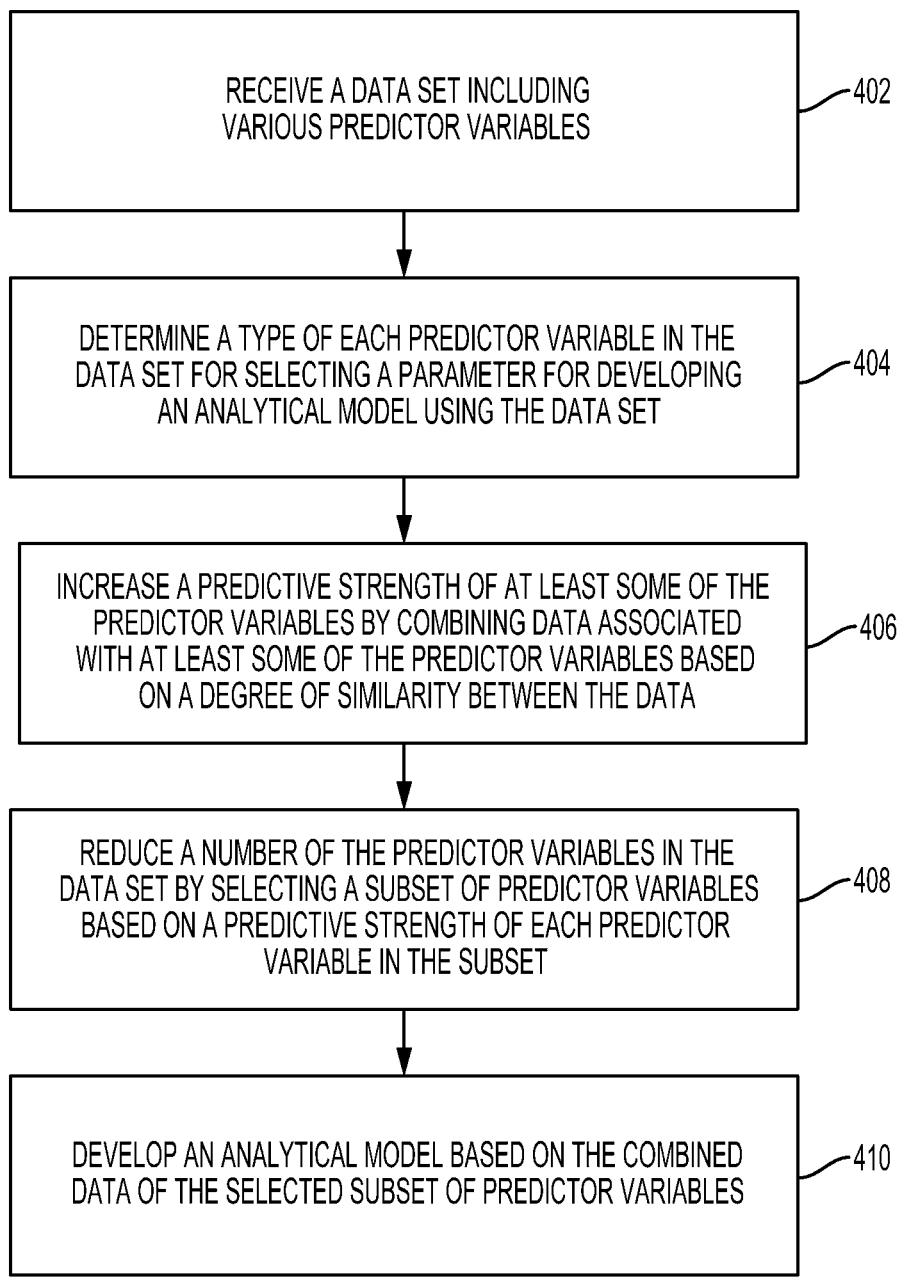
FIG. 4 is a flow chart depicting an example of a process for automatically developing an analytical model, according to certain aspects of the present disclosure.
Figure 15:
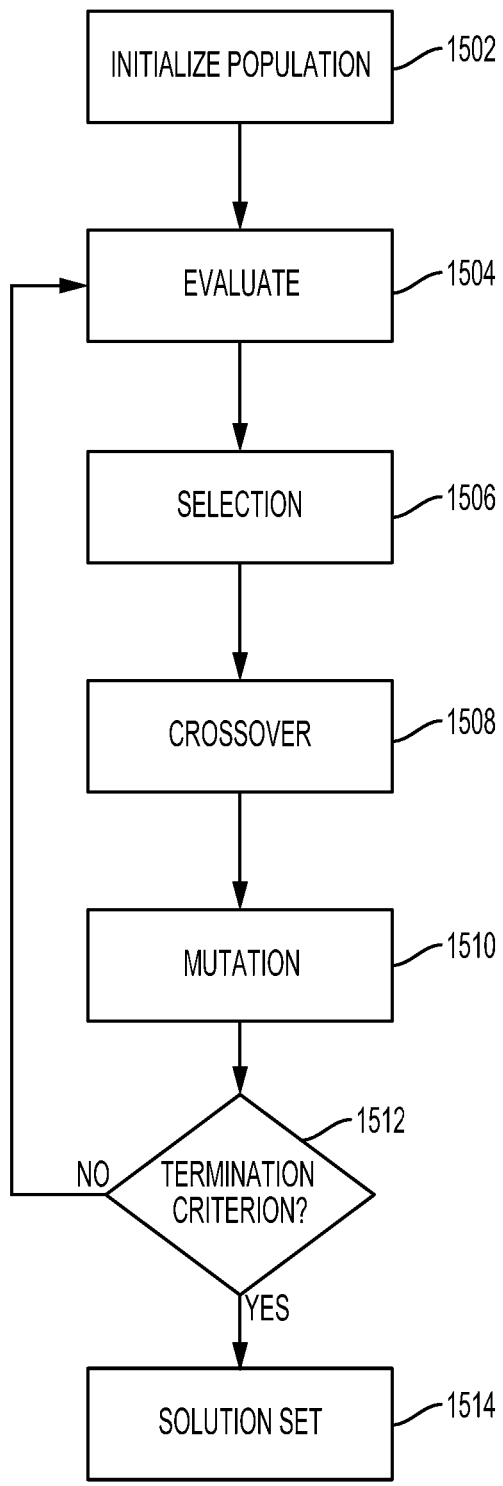

FIG. 15 is a flow chart depicting an example of a genetic algorithm that can be used to reduce a number of predictor variable in the process of FIG. 4, according to certain aspects of the present disclosure.

Figure 16:
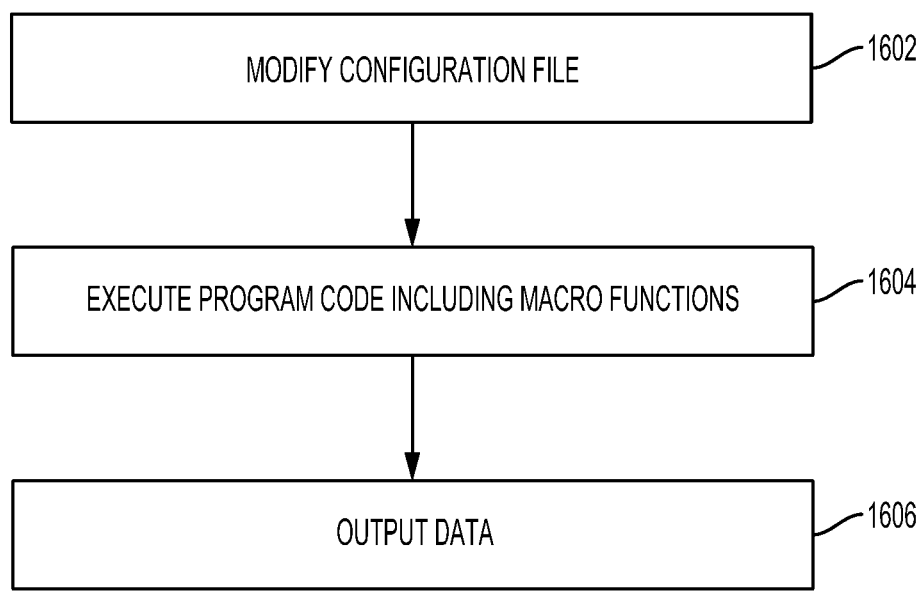

FIG. 16 is a flow chart depicting an example of a process for using an automated model development tool with a user application to develop an analytical model for identifying a relationship between sets of predictor variables and one or more output variables, according to certain aspects of the present disclosure.

FIG. 17A is a table depicting a performance of a model developed using the automated model development tool on a sample data set, according to certain examples the present disclosure.

FIG. 17B is a table depicting a performance of a manually developed model, according to certain examples of the present disclosure.

Figure 18:
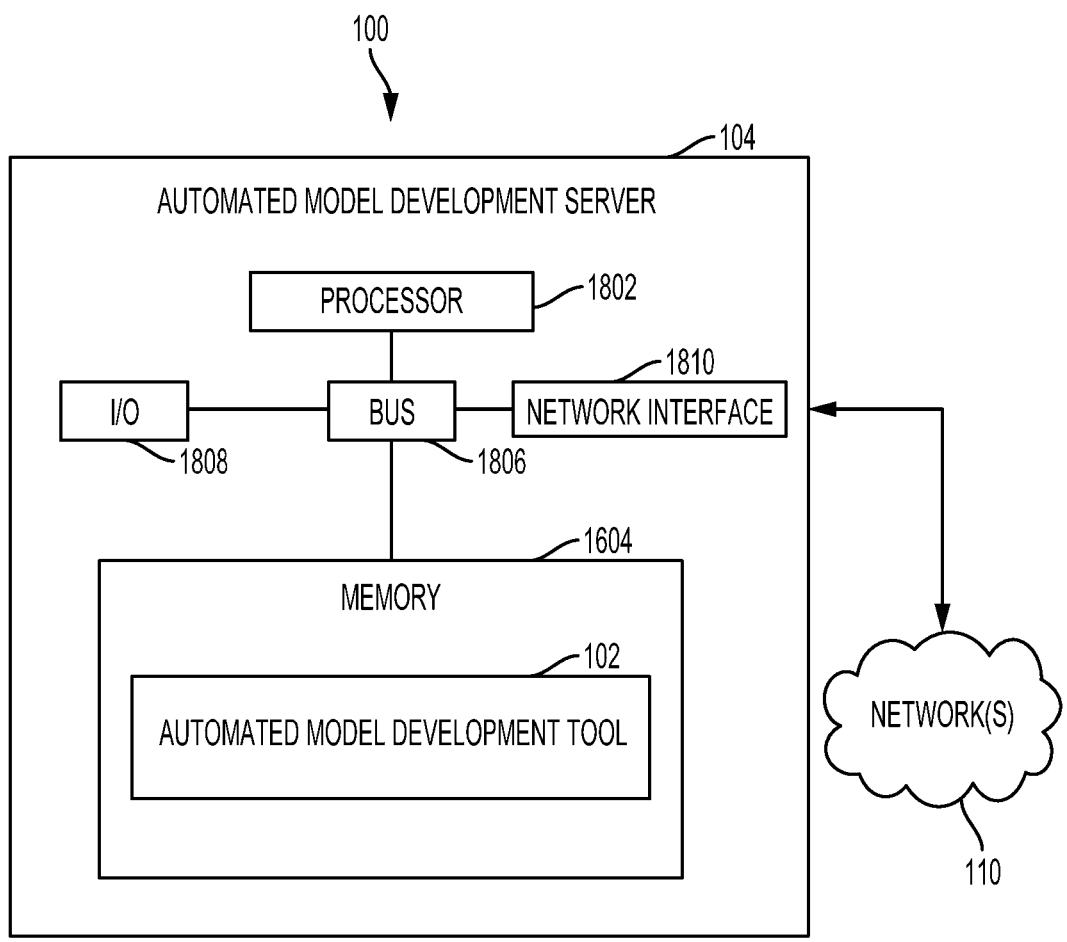

FIG. 18 is a block diagram depicting an example of an automated model development server that can execute an automated model development tool, according to certain examples of the present disclosure.

DETAILED DESCRIPTION

Certain aspects and features of the present disclosure are directed to an automated model development tool for automatically generating, modifying, selecting, or otherwise developing one or more analytical models. Analytical models can be used for identifying relationships between sets of predictor variables and one or more output variables in various machine learning applications.

As discussed above, manually developing accurate analytical models may present difficulties. Calibrating the various algorithms used to generate an analytical model, which may involve a precision that cannot be obtained by manually development of analytical models, can improve an accuracy with which the analytical model can identify such patterns and express the various patterns in a usable format (e.g., as a mathematical equation or function). Manually developing the analytical model may cause errors in the analytical model development process, which can decrease the accuracy of the analytical model. Minimizing or obviating the involvement of a user in the process of developing the analytical model (e.g., minimizing or obviating manual steps to develop the analytical model) can improve an accuracy with which the model can be used to recognize patterns in the input data set and make predictions based on such patterns.

In some aspects, the automated model development tool can generate, modify, select or develop the analytical model by performing one or more automated operations. An example of an automated operation includes, but is not limited to, automatically analyzing one or more predictor variables. Analyzing the predictor variables can include performing various operations on the predictor variables to determine a type of a predictor variable (e.g., whether a predictor variable is a numeric predictor variable or a character variable), classifying or grouping the predictor variables based on the type of each predictor variable, or determining a similarity among data items associated with one or more predictor variables (e.g., determining a similarity between multiple output values associated with one or more predictor variables).

Another example of an automated operation includes, but is not limited to, automatically binning (e.g., combining) data about one or more identified predictor variables in a statistically sound manner. For example, the automated model development tool can automatically collapse (e.g., combine) sufficiently similar bins (e.g., groups) of data associated with the identified predictor variables. Combining similar data bins can provide monotonicity between the identified predictor variables and the one or more output variables. Examples of monotonicity between the predictor variables and the output variables includes a relationship in which a value of the output variable increases as a value of each of the predictor variables increases or a relationship in which the value of the output variable decreases as the value of each of the predictor variable increases. Certain analytic models, such as (but not limited to) analytic models developed using logistic regression, may require monotonicity for the various bins of the predictor variable generated by the model development process. In some aspects, automatically binning data about one or more identified predictor variables can create the monotonicity required for developing such models in an automated manner.

Another example of an automated operation includes, but is not limited to, automatically reducing the number of predictor variables used to generate, modify, or develop the analytical model. In some aspects, the number of predictor variables used for the analytical model can be reduced such that predictor variables with a higher level of predictive strength are used to develop the analytical model and predictor variables with a lower level of predictive strength are excluded from the analytical model. A higher level of predictive strength can be, for example, a higher relative influence of a predictor variable on a given dependent variable as compared to other predictor variables. A lower level of predictive strength can be, for example, a relative influence of a predictor variable on a given dependent variable as compared to other predictor variables.

In some aspects, an analytical model developed using the automated model development tool can be used in various machine learning applications, including, for example, in some credit-scoring applications. For example, the analytical model can be used to determine a relationship between predictor variables associated with an entity's prior actions, or transactions involving the entity, and output variables that correspond with a probability associated with the entity. As an example, the automated model development tool can determine a relationship between attributes of the entity that can be obtained from credit files or records, financial records, consumer records, or other data about the activities or characteristics of the entity and a probability of the entity performing a task, such as, for example, defaulting on a financial obligation, or a probability of the entity meeting a criteria, such as, for example, being approved for a loan). In some aspects, the predictor variables can be independent variables and the output variables can be dependent variables (e.g., dependent on the predictor variables).

In some aspects, the automated model development tool can automatically develop an analytical model in a manner that is compliant with one or more of industry requirements, regulatory requirements, and other requirements imposed on the model development process. Automating the model development process can also improve a performance of the model developed using the automated model development tool as compared to a manually developed model. For example, manually developing a model may include using a small data set to develop the model to reduce the complexity of algorithms used to develop model, such that the model can be developed manually. In contrast, the data set used to automatically develop the model using the automated model development tool can be large or robust (e.g., in the order of gigabytes or terabytes), which can allow the model developed using the automatic model development tool to have an improved performance as compared to the manually developed model. Because the data set used to develop to automatically develop the model can be large, developing the model by performing one or more automated operations using the automated model tool 1 can also provide operational efficiency by automating the model development process, thereby minimizing or obviating the involvement of an end user in the model development process.

In some aspects, the automated model development tool can provide a platform for developing an analytical model that allows standardized model outcomes with user-specified criteria. The automated model development tool can provide consistent comparisons of predictive performance across different data. In some aspects, the automated model development tool can minimize coding efforts and standardize other processes such that model development lead time is reduced.

In some aspects, the automated model development tool can automate one or more processes such as, for example, data exploration, sample selection, partitioning, distribution analysis, variable selection, variable transformations, variable reduction, logistic regression, etc. The automation of one or more of these processes can eliminate or reduce involvement of an end user in the development of underlying mathematical and statistical algorithms. The automation of one or more of these processes can also eliminate or reduce the involvement of an end user in the coding process. Eliminating or reducing the involvement of the end user in the development of the mathematical and statistical algorithms or in the coding process can allow complex algorithms and codes to be used to develop the model, which may not be achievable if the model is developed manually by a user. In some aspects, such standardization allows for efficient model build development times.

In some aspects, the automated model development tool can be used for binary classification model development. In additional or alternative aspects, the automated model development tool can be used for one or more supervisory and non-supervisory machine-learning applications. In additional or alternative aspects, the automated model development tool can be used with one or more of structured and unstructured data sources.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples, but, like the illustrative examples, should not be used to limit the present disclosure.

Figure 1:
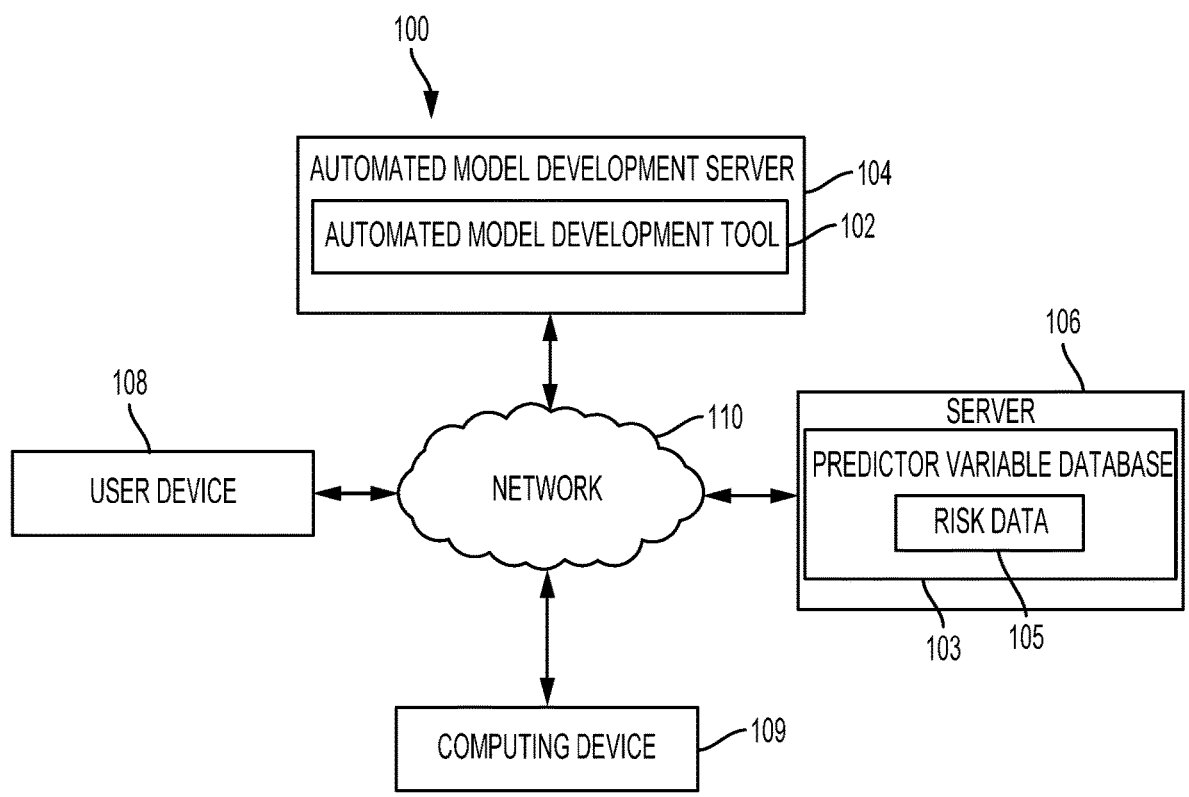
FIG. 1 is a block diagram depicting an example of a computing environment in which an automated model development tool operates, according to certain aspects of the present disclosure.

FIG. 1 is a block diagram depicting an example of a computing environment 100 in which an automated model development tool 102 operates. Computing environment 100 can include the automated model development tool 102. The automated model development tool 102 can be executed by an automated model development server 104. The automated model development tool 102 can include one or more modules for acquiring, processing, and analyzing data to automatically generate, modify, select, or develop an analytical model that can be used for identifying relationships between predictor variables and output variables in various machine learning applications. Examples of predictor variables include, but are not limited to, data associated with an entity's prior actions or transactions involving the entity (e.g., information that can be obtained from credit files or records, financial records, consumer records, or other data about the activities or characteristics of the entity). Examples of output variables include, but are not limited to, data associated with the entity (e.g., a probability of the entity performing a task, such as, for example, defaulting on a financial obligation or responding to a sales offer, or a probability of the entity meeting a criteria, such as, for example, being approved for a loan).

In some aspects, the automated model development tool 102 can obtain the data used for generating, modifying, selecting, or developing the analytical model from a predictor variable database 103, a user device 108, or any other source. In some aspects, the automated model development server 104 can be a specialized computer or other machine that processes data in computing environment 100 for automatically developing the analytical model.

The computing environment 100 can also include a server 106 that hosts the predictor variable database 103. The variable database 103 depicted in FIG. 1 is accessible by the user device 108 or the automated model development tool 102 via the network 110. The predictor variable database 103 can store data to be accessed or processed by any device in the computing environment 100 (e.g., the automated model development tool 102, the user device 108, or the computing device 109). The predictor variable database 103 can also store data that has been processed by one or more devices in the computing environment 100.

The predictor variable database 103 can store a variety of different types of data organized in a variety of different ways and from a variety of different sources. For example, the predictor variable database 103 can include risk data 105. Risk data 105 can be any data that can be used to generate, modify, select, or otherwise automatically develop an analytical model that can be used for identifying relationships between predictor variables and output variables. As an example, risk data 105 can include data obtained from credit records, credit files, financial records, or any other data that can be used to identify a relationship between a predictor variable and an output variable.

The user device 108 may include any computing device that can communicate with the computing environment 100. For example, the user device 108 may send data to the computing environment 100 or a device in the computing environment 100 (e.g., the automated model development tool 102, the predictor variable database 103, or the computing device 109) to be stored or processed. In some aspects, the user device 108 is a mobile device (e.g., a mobile telephone, a smartphone, a PDA, a table, a laptop, etc.) In other examples, the user device 108 is a non-mobile device (e.g., a desktop computer or another type of user or network device). In some aspects, the user device 108 can be used to interact with the automated model development tool 102. For example, the user device 108 can be used to present one or more graphical user interfaces to allow a user of the user device 108 to communicate (e.g., provide or receive data) with the automated model development tool 102.

The computing environment 100 can also include a computing device 109. The computing device 109 may include any computing device that can communicate with the computing environment 100. In some aspects, the computing device 109 may be configured in substantially the same manner as the user device 108 and may process data received from a device in the computing environment 100 or communicate or store data to be processed by a device in the computing environment 100.

Communication with the computing environment 100 may occur on, or be facilitated by, a network 110. For example, the automated model development tool 102, the user device 108, the predictor variable database 103, and the computing device 109 may communicate (e.g., transmit or receive data) with each other via the network 110. The computing environment 100 can include one or more of a variety of different types of networks, including a wireless network, a wired network, or a combination of a wired and wireless network.

For illustrative purposes, the computing environment 100 of FIG. 1 is depicted as having a certain number of components. But, in other examples, the computing environment 100 can have any number of additional or alternative components. Further, FIG. 1 depicts, for illustrative purposes, a particular arrangement of the automated model development tool 102, user device 108, computing device 109, predictor variable database 103, and network 110. But various additional arrangements are possible. For example, the automated model development tool 102 can directly communicate with the predictor variable database 103 or the computing device 109, bypassing the network 110. Furthermore, while FIG. 1 depicts, for illustrative purposes, the automated model development tool 102 and the predictor variable database 103 as separate components on different servers, other implementations are possible. For example, in some aspects, the automated model development tool 102 and the predictor variable database 103 can be part of a common system hosted on one or more servers.

Figure 2:
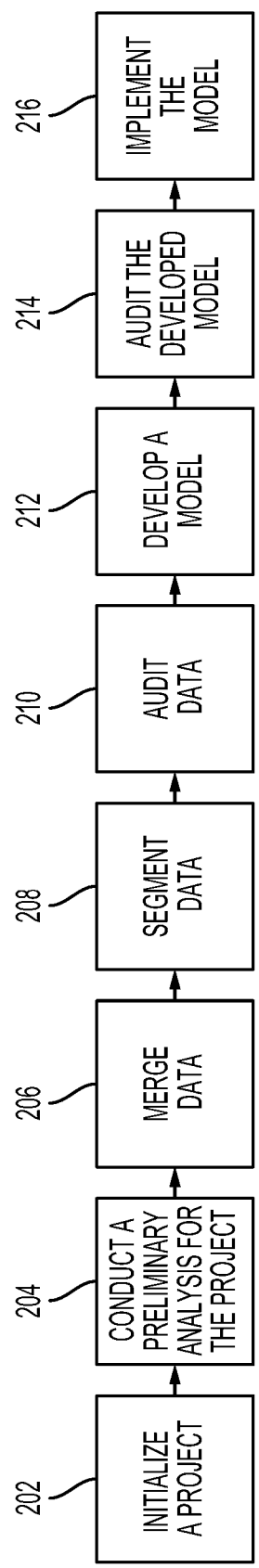
FIG. 2 is a flow chart depicting an example of a process that involves developing an analytical model with an automated model development tool, according to certain aspects of the present disclosure.

In some aspects, the automated model development tool 102 can be used to develop an analytical model as part of a process for identifying relationships between predictor variables and output variables in various machine learning applications. For example, FIG. 2 is a flow chart depicting an example of a process that can include using an automated model development tool to develop an analytical model.

In block 202, a project is initialized. In some aspects, a computing device (e.g., the computing device 109 of FIG. 1) can be used to initialize the project. In some aspects, initializing the project can include designing a project associated with using an automated model development tool (e.g., the automated model development tool 102 of FIG. 1) to develop an analytical model for machine learning applications (e.g., identifying relationships between predictor variables and output variables).

In block 204, a preliminary analysis is conducted for the project initialized in block 202. In some aspects, the computing device can be used to conduct the preliminary analysis. In some aspects, conducting the preliminary analysis can include gathering data for the project. For example, the data can be gathered from various sources and may be associated with a predictor variable or an output variable. As an example, the computing device can gather data about an entity from credit files, financial records, etc. In some aspects, the data can be gathered and stored in a database (e.g., the predictor variable database 103 of FIG. 1) to be accessed, processed, or analyzed.

In block 206, data from various sources (e.g., the data gathered in block 204) is merged. In some aspects, the computing device can be used to merge the data. In some aspects, merging the data includes merging the data into a common data set. The common data set can be stored or maintained in a database (e.g., the predictor variable database 103 of FIG. 1). In other examples, merging the data includes manipulating (e.g., adjusting or changing) the data.

In block 208, data (e.g., the data merged in block 206) is segmented. In some aspects, the computing device can be used to segment the data. In some aspects, segmenting the data can include dividing or separating data. For example, data about various entities can be separated according to demographics or other relevant population segments for the entities.

In block 210, data (e.g., the data segmented in block 208) is audited. In some aspects, the computing device can be used to audit the data. In some aspects, auditing the data can include auditing the data for reliability.

In block 212, a model is developed. In some aspects, an automated model development tool (e.g., the automated model development tool 102 of FIG. 1) can develop the model. The model can be an analytical model that can be used for identifying relationships between sets of predictor variables and one or more output variables in various machine learning applications. In some aspects, using the automated model development tool to develop the analytical model can assist a statistician or other user to perform one or more of model development, feasibility analysis after segmentation, or creation of data sets for development and validation.

In block 214, the model (e.g., the model developed in block 212) is audited, and in block 216, the model is implemented. In some aspects, the automated model development tool audits and implements the model. In some aspects, implementing the model in block 216 can include using the model to identify relationships between sets of predictor variables and one or more output variables.

In some aspects, the automated model development tool can standardize a process used to develop a model (e.g., the model developed in block 212). For example, the automated model development tool can be used to standardize associated programs used to perform one or more of analytics, data management, and predictive analysis, such as Statistical Analysis System ("SAS") programs. In additional or alternative aspects, the automated model development tool can allow users (e.g., managers) to compare a performance of different models across the same scale. In additional or alternative aspects, the automated model development tool can allow advanced analytical tools to be integrated in later phases.

In some aspects, the automated model development tool performs one or more operations for selecting, generating, modifying, or otherwise automatically developing an analytic model. In some aspects, the automated model development tool can perform a missing imputation algorithm based on an odds index function. The automated model development tool can also perform an auto-binning group generation operation. In additional or alternative aspects, the automated model development tool can perform a genetic algorithm for implementing a variable reduction operation in parallel with one or more other algorithms for implementing the variable reduction operation. In additional or alternative aspects, the automated model development tool can provide a user-selected, model-refinement option for a semi-finalized model. In additional or alternative aspects, the automated model development tool can generate exploratory data analysis reports with data visualization. Examples of these reports include reports with original data, reports generated prior to a missing imputation process being performed, reports generated subsequent to a missing imputation process being performed, reports generated after a binning group collapsing algorithm being performed, reports generated after a binning group smoothing algorithm being performed.

In some aspects, the automated model development tool can include one or more modules for performing the above operations to automatically develop an analytical model. For example, FIG. 3 is a block diagram depicting an example of the automated model development tool 102 of FIG. 1. The automated model development tool 102 depicted in FIG. 3 can include various modules 302, 304, 306, 308, 310, 312, 314, 316, 318, 320, 322, 324 for automatically generating, modifying, selecting, or developing an analytical model that can be used in various machine learning applications (e.g., used to identify relationships between sets of predictor variables an one or more output variables). Each of the modules 302, 304, 306, 308, 310, 312, 314, 316, 318, 320, 322, 324 can include one or more instructions stored on a computer-readable storage medium and executable by processors of one or more computing devices (e.g., the automated model development server 104 of FIG. 1). Executing the instructions causes the automated model development tool 102 to automatically generate, modify, select, or develop the analytical model.

The automated model development tool 102 can include a variable analysis module 302 for obtaining or receiving a data set and analyzing data in the data set. In some aspects, the variable analysis module 302 can obtain or receive the data set from a suitable data structure, such as the predictor variable database 103 of FIG. 1. The data set may include one or more predictor variables that can be used by the automated model development tool 102 to develop an analytical model.

In some aspects, the variable analysis module 302 can automatically analyze various predictor variables obtained by the automated model development tool 102. For example, the automated model development tool 102 can use the variable analysis module 302 to analyze predictor variables in the data set and automatically determine a type of each predictor variable. As an example, the automated model development tool can automatically determine whether each predictor variable is a numeric predictor variable or a character predictor variable. In some aspects, the automated model development tool 102 can use the variable analysis module 302 for classifying (e.g., grouping) predictor variables based on a type of each predictor variable. For example, the automated model development tool 102 can use the variable analysis module 302 to group numerical predictor variables together or group character predictor variables together.

In some aspects, the type of each predictor variable or classification of each predictor variable can be used to determine or select one or more operations to be performed on the predictor variable or one or more parameters for developing an analytical model using the predictor variables. As an example, the automated model development tool 102 may use numeric variables to develop a certain type of model, such as (but not limited to) a logistic regression model. As another example, if a predictor variable is a character variable, the automated model development tool 102 can use the variable analysis module 302 to convert a character variable into a numeric variable (e.g., 0 or 1) associated with the character variable and use the converted numeric variable for developing a type of analytical model (e.g., a logistic regression model).

In some aspects, the variable analysis module 302 can automatically exclude one or more predictor variables from a classification operation performed by the automated model development tool 102. For example, the variable analysis module 302 can receive data (e.g., from the computing device 109, the user device 108, or any other device) or user input. The received data or user input can indicate one or more predictor variables to be excluded from being classified by the automated model development tool 102. As an example, the variable analysis module 302 can present a graphical user interface to a user of the automated model development tool 102 (e.g., via the user device 108 of FIG. 1), which can allow the user to provide data indicating one or more predictor variables to be excluded from being classified by the automated model development tool 102. In some aspects, the automated model development tool 102 may exclude certain predictor variables in the data set from a classification based on the received data. As an example, the data received can correspond to one or more predictor variables having a low predictive strength and the automated model development tool may exclude the predictor variables from being classified. In some aspects, excluding the predictor variables from being classified may improve the accuracy with which a model developed using the automated model development tool identifies relationships between predictor variables and output variables.

In some aspects, the automated model development tool 102 can use the variable analysis module 302 to output data related to analyzing or grouping the predictor variables. For example, the automated model development tool 102 can use the variable analysis module 302 to generate and output a chart, list, table, or other data that indicates predictor variables in the data set that are numeric predictor variables and predictor variables in the data set that are character predictor variables. As an example, the automated model development tool 102 can output a list that includes numeric predictor variables and a list that includes character predictor variables.

The automated model development tool 102 can include an exploratory data analysis module 304 for automatically analyzing predictor variables in the data set. The exploratory data analysis module 304 can perform various operations on the predictor variables for analyzing the predictor variables. For example, the exploratory data analysis module 304 can perform an exploratory data analysis on the predictor variables. In the exploratory data analysis, the automated model development tool 102 can automatically analyze each predictor variable to determine and summarize characteristics of each predictor variable. In some aspects, the automated model development tool 102 can perform the exploratory data analysis on numeric predictor variables (e.g., the numeric predictor variables identified using the variable analysis module 302). In some aspects, the automated model development tool 102 can perform the exploratory data analysis on any predictor variable. The automated model development tool 102 can use the exploratory data analysis module 304 to output data related to the exploratory data analysis operation.

In some aspects, the exploratory data analysis module 304 can determine, based on the exploratory data analysis, an odds index or a good/bad ratio associated with each of the predictor variables. The odds index can indicate a ratio of positive or negative outcomes associated with each predictor variable. A positive outcome can indicate that a condition has been satisfied or can correspond to a positive financial activity or other activity indicative of low risk. A negative outcome can indicate that the condition has not been satisfied or a negative financial activity (e.g., default on a loan) or other activity indicative of high risk.

In some aspects, the exploratory data analysis module 304 can determine a bivariate relationship or correlation associated with one or more of the predictor variables based on the odds index of the one or more predictor variables. In some aspects, the bivariate relationship associated with a predictor variable can be used to determine (e.g., quantify) a predictive strength of the predictor variable with respect to an odds index. The predictive strength of the predictor variable can indicate an extent to which the predictor variable can be used to accurately predict a positive or negative outcome or a likelihood of a positive or negative outcome occurring based on the predictor variable. In some aspects, the predictive strength of the predictive variable may indicate an extent to which the predictor variable can be used to accurately predict an output variable.

For instance, the predictor variable can be a number of times that an entity (e.g., a consumer) fails to pay an invoice within 90 days. A large value for this predictor variable (e.g., multiple delinquencies) can result in a higher number of negative outcomes (e.g., default on the invoice). A higher number of negative outcomes can decrease the odds index (e.g., result in a higher number of adverse outcomes, such as default, across one or more consumers). As another example, a small value for the predictor variable (e.g., fewer delinquencies) can result in a higher positive outcome (e.g., paying the invoice on time) or a lower number of negative outcomes, which can increase the odds index (e.g., result in a lower number of adverse outcomes, such as default, across one or more consumers). In some aspects, the exploratory data analysis module 304 can determine and quantify the odds index for each predictor variable.

The automated model development tool 102 can also include a missing data module 306. The missing data module 306 can be used for analyzing or determining an amount of data or a percentage of data about a predictor variable in the data set that is missing (e.g., unavailable). In some aspects, missing data can include data about a predictor variable associated with an entity that is unavailable. In one example, data may be missing for the entity because the entity has not engaged in any trade or transaction. In another example, data may be missing for an entity because one or more trades or transactions by the entity have been excluded from the data set. In some aspects, the automated model development tool 102 can use the missing data module 306 to determine the amount or the percent of data missing for each predictor variable in the data set. For example, the missing data module 306 can tabulate a percent of missing values for each predictor variable.

In some aspects, the missing data module 306 can exclude (e.g., remove) certain predictor variables having a percentage of missing data that is above a threshold from the data set. For example, the missing data module 306 can receive data (e.g., from the computing device 109, the user device 108, or any other device) or user input. The data can indicate a missing percentage threshold. The missing percentage threshold can correspond to a threshold of percentage of missing data or values for a predictor variable. In some aspects, the missing data module 306 can exclude (e.g., remove) predictor variables having a percent of missing data that is above the threshold from the data set based on the signal. In some aspects, removing predictor variables having a percent of missing data above the threshold can improve the data set by creating a more robust data set (e.g., reducing a sparsity of the data set), which can improve the accuracy of a model developed using the data set.

In some aspects, the automated model development tool 102 can use the missing data module 306 to generate a missing indicator code for each predictor variable that is not excluded from the data set. In some aspects, the missing indicator code indicates that data or a value associated with the predictor variable is not available.

In some aspects, the missing data module 306 can also be used to output data associated with analyzing or determining an amount of data or a percentage of data about a predictor variable that is missing (e.g., a chart, a report, a table, etc., associated with determining the missing percentage of data). As an example, the missing data module 306 can generate and output data that indicates each predictor variable, along with a corresponding percentage of missing data for the predictor variable.

In some aspects, the automated model development tool 102 can include an outlier data module 308 for removing or adjusting outlier data from the data set. Outlier data can include outlier predictor variables associated with data that is above a maximum threshold or outlier predictor variables associated with data that is below a minimum threshold. In some aspects, the outlier data module 308 can perform various capping operations for removing or adjusting outlier data that is above the maximum threshold. The outlier data module 308 can also perform flooring operations for removing data that is below the minimum threshold. In some aspects, the maximum threshold and the minimum threshold can be based on high and low percentiles respectively. In some aspects, the outlier data module 308 can receive the maximum threshold or the minimum threshold (e.g., from another computing device or an indicia of user input) and remove outlier data based on the minimum and maximum thresholds.

The automated model development tool 102 can also include a value assignment module 310. The value assignment module 310 can be used for reassigning or assigning missing data or values associated with a predictor variable (e.g., the missing values in the data set determined using the missing data module 306). In some aspects, the value assignment module 310 can assign a bin of a predictor variable that is missing data to another bin that has available data. The assignment can be performed based on an odds index associated with each of the bins. Each bin of a predictor variable can include a set of data or output values (e.g., dependent values, such as, an odds index) that correspond to a range of values of the predictor variable. As an illustrative example, a bin of a predictor variable can be a row of data that includes a set of output variables that correspond to a range of values of a predictor variable. In this example, missing data can include a range of values of a predictor variable for which data is unavailable (e.g., a range of a number of delinquencies associated with an entity for which data is unavailable).

For example, the automated model development tool 102 can determine that data associated with a bin of the predictor variable is missing. The value assignment module 310 can determine a similarity between various bins of the predictor variable by comparing characteristics or data associated with the various bins of the predictor variable (e.g., determining a similarity by comparing odds indices of one or more bins of the predictor variable). The value assignment module 310 can assign bins having missing data to bins having available data based on the similarity.

In some aspects, the automated model development tool 102 can include an automatic binning module 312 used for automatically binning (e.g., combining or collapsing) similar data in the data set. In some aspects, automatically binning data in the data set can include combining two or more categories of data in the data set into a common category. In some aspects, the automatic binning module 312 can combine similar data in the data set after missing values in the data set are assigned (e.g., after assigning values using the value assignment module 310). In some aspects, the automatic binning module 312 can combine bins of a predictor variable based on a threshold degree of similarity between the bins.

For example, the automatic binning module 312 can compare various bins of a predictor variable and determine a similarity between the bins. In some aspects, the automatic binning module 312 can include instructions for receiving data corresponding to a desired degree of similarity or threshold degree of similarity (e.g., from another computing device or an indicia of user input). The automatic binning module 312 can also include instructions for combining one or more bins that are sufficiently similar based on the desired degree of similarity or threshold degree of similarity. As an illustrative example, the automatic binning module 312 can combine one or more rows of data associated with a predictor variable based on a similarity of characteristics of the one or more rows of data.

In some aspects, the automatic binning module 312 can automatically smooth various bins of a predictor variable. Automatically smoothing various bins can include collapsing the bins of the predictor variable. In some aspects, collapsing the various bins can automatically create a monotonic sequence of bins of the predictor variable. For example, the automatic binning module 312 can iteratively collapse (e.g., combine) bins of the predictor variable such that a trend of values of odds indices associated with a sequence of bins is monotonic. In some example, automatically smoothing the bins can include further collapsing the bins to increase a monotonicity based on the sign of a correlation between the predictor variable and an output variable (e.g., an odds index).

In some aspects, using the automatic binning module 312 to combine bins of a predictor variable can allow the use of logistic regression or any suitable function to develop a model using the automated model development tool 102. Some models, such as (but not limited to) models developed using logistic regression, may require monotonicity for the various bins of the predictor variable generated by the model development process. In some aspects, the automatic binning module 312 can included instructions for causing the automated model development tool 102 to perform automatic binning operations to create a monotonic sequence in an automated manner.

In some aspects, the automatic binning module 312 can perform various operations associated with automatically binning similar data in the data set. As an example, the automatic binning module 312 can create or identify a neutral bin or group associated with each predictor variable in the data set (e.g., as described below with respect to FIGS. 5 and 12). A neutral bin can be a bin of a predictor variable that has a predictive strength that is less than a predictive strength of other bins of the predictor variable. As an illustrative example, a neutral bin can be a row of data associated with a range of values of a predictor variable that has a lower predictive strength than other rows of data that include other ranges of values of the predictor variable. In some aspects, a neutral bin can be identified based on one or more conditions. For example, the automatic binning module 312 can identify the neutral bin based on a bin associated with a predictor variable satisfying one or more conditions.

In some aspects, the automatic binning module 312 can also be used to output data associated with automatically binning data in the data set (e.g., a chart, a report, a table, etc., associated with combining data in the data set).

In some aspects, the automated model development tool 102 can include a variable transformation module 314 for continuously transforming predictor variables in the data set. Transforming a predictor variable can involve applying a mathematical operation to change a measurement scale of the predictor variable (e.g., multiplying, dividing, or applying other mathematical operations to the predictor variable). In some aspects, continuously transforming predictor variables can include applying various transforms (e.g., mathematical operations) to each predictor variable. In some aspects, applying a transform to a predictor variable can increase the monotonicity of the model generated, modified, selected, or developed using the automated model development tool 102.

In some aspects, the automated model development tool 102 can include a correlation analysis module 316 for automatically determining a degree to which a predictor variable affects an output variable (e.g., an impact of a predictor variable on an output variable). In some aspects, the correlation analysis module 316 can determine a degree to which a predictor variable affects one or more other predictor variables. In some aspects, the degree to which a predictor variable affects another predictor variable can indicate a correlation between the predictor variable and one or more other predictor variables, which can be used for reference purposes.

In some aspects, the automated model development tool 102 can include a variable reduction module 318 for reducing a number of predictor variables in the data set. In some aspects, the variable reduction module 318 can execute a variable reduction operation that includes executing one or more algorithms for identifying or selecting sets of predictor variables having a threshold level of predictive strength. In some aspects, the algorithm can be a parallel algorithm (e.g., an algorithm that can be executed simultaneously on various processing devices or computing devices) used to identify the sets of predictor variables and the variable reduction module 318 can combine or de-duplicate the sets of predictor variables using the parallel algorithm after the sets of predictor variables are identified. An example of the algorithm that can be used to identify or select the sets of predictor variables includes, but is not limited to, a correlation analysis algorithm (e.g., based on the CORR procedure from SAS) that is used to determine if a possible linear relationship exists between two variables. Another example of the algorithm includes, but is not limited to, a stepwise discriminate analysis algorithm (e.g., based on the STEPDISC procedure from SAS). Still another example of the algorithm includes, but is not limited to, a genetic algorithm (e.g., an algorithm that can imitate an evolutionary process or a non-linear stochastic-based search or optimization algorithm). In some aspects, the variable reduction module 318 can remove or exclude predictor variables that do not have the threshold level of predictive strength (e.g., predictor variables that are not included in the identified sets of predictor variables) from the data set to reduce the number of predictor variables in the data set. In some aspects, excluding predictor variables that do not have the threshold level of predictive strength can improve the data set used to develop an analytical model by using predictor variables that have a high relative influence on a given dependent variable as compared to the predictor variables excluded from the data set, which may improve an accuracy of a model developed using the automated model development tool.

In some aspects, executing the variable reduction operation using the variable reduction module 318 can improve a predictive strength of an analytical model developed using the automated model development tool 102. For example, if all predictor variables are used in the analytical model, the inclusion of a first predictor variable that is correlated with a second predictor variable may incorrectly change the sign of output variables from the analytical model with respect to at least one of the first and second predictor variables. Using the variable reduction module 318 to execute the variable reduction operation can eliminate one of the predictor variables and the associated negative impact on the analytical model.

In some aspects, the automated model development tool 102 can include a regression model module 320. The regression model module 320 can execute a regression operation that involves using identified predictor variables (e.g., the predictor variables identified using the variable reduction module 318) in a logistic regression or any suitable function. In some aspects, the regression model module 320 can use the identified predictor variables to develop an analytical model, which can be a statistically sound analytical model.

In some aspects, the automated model development tool 102 can include a model refining module 322 for automatically evaluating and improving an analytical model (e.g., the analytical model developed using the regression model module 320). For example, the model refining module 322 can automatically tune the analytical model. Tuning the analytical model can include determining and evaluating one or more statistics or data related to the analytical model and adjusting the analytical model based on the one or more statistics to improve the degree to which the analytical model provides outputs that correspond to a real-world scenario. Examples of the statistics include, but are not limited to, p-values, signs, a variance inflation factor, or Wald chi-square statistics.

In some aspects, the automated model development tool 102 can include a model completion module 324. The model completion module 324 can be used for finalizing a model developed using the automated model development tool (e.g., the analytical model refined using the model refining module 322). In some aspects, the model completion module 324 can use the analytical model to output data. For example, the automated model development tool 102 can use the analytical model to generate and output a gains chart (e.g., a chart indicating a measure of an effectiveness of the analytical model), one or more reports, or a model equation associated with the analytical model. In some aspects, the model completion module 324 can use the analytical model to identify relationships between sets of predictor variables and one or more output variables in various machine learning applications.

FIG. 4 is a flow chart depicting an example of a process for automatically developing an analytical model. For illustrative purposes, the process is described with respect to the examples depicted in FIGS. 1-3. Other implementations, however, are possible.

In block 402, a data set that includes various predictor variables is received. In some aspects, the predictor variables are obtained by an automated model development tool (e.g., the automated model development tool 102 using the variable analysis module 302 of FIG. 3). For example, the automated model development tool can obtain the data set from a predictor variable database (e.g., the predictor variable database 103 of FIG. 1) or a computing device (e.g., the computing device 101 of FIG. 1). In some aspects, the automated model development tool can obtain the data set from the computing device after the computing device performs one or more operations or processes on the data set (e.g., the operations described with respect to blocks 202-210 of FIG. 2). In some aspects, the automated model development tool can obtain the data set from any other data source. Predictor variables can include data associated with an entity that describes prior actions or transactions involving the entity (e.g., information that can be obtained from credit files or records, financial records, consumer records, or other data about the activities or characteristics of the entity). In some aspects, predictor variables can be obtained from credit files, financial records, consumer records, etc. In some aspects, the predictor variables can be independent variables.

In block 404, a type of each predictor variable in the data set is determined for selecting a parameter for developing analytical model using the data set. In some aspects, the automated model development tool automatically determines the type of a predictor variable (e.g., using the variable analysis module 302 of FIG. 3). For example, the automated model development tool can analyze each predictor variable and determine whether each predictor variable is a numeric predictor variable or a character predictor variable. In some aspects, the type of each predictor variable can be used to determine or select one or more operations to be performed on the predictor variable or one or more parameters for developing an analytical model developed using the predictor variables. As an example, certain models, such as (but not limited to) logistic regression models may require numeric variables. In such examples, the automated model development tool may use the identified numeric variables in the data set for developing a logistic regression model. As another example, if a predictor variable is a character variable, the character variable may be converted or turned into a numeric variable (e.g., 0 or 1) associated with the character variable and can be used by the automated model development tool to develop a certain type of analytical model (e.g., logistic regression model).

In block 406, a predictive strength of at least some of the predictor variables in the data set by combining data associated with at least some of the predictor variables based on a degree of similarity between the data. In some aspects, the automated model development tool can automatically combine data associated with the predictor variables having a determined type (e.g., in block 406) based on a similarity between data associated with the predictor variables having a determined type. In some aspects, the automated model development tool can automatically combine the data by executing an automatic binning operation (e.g., using the automatic binning module 312 of FIG. 3). For example, the automated model development tool can combine bins of the predictor variable based on a threshold degree of similarity between the bins. As an example, the automated model development tool can receive data (e.g., from a computing device or user input) that indicates the threshold degree of similarity between bins. The automated model development tool can combine various bins that are sufficiently similar based on the threshold degree of similarity.

For instance, FIGS. 5 and 6 depict tables 502 and 602 from an example of automatically binning (e.g., combining) data associated with a predictor variable using the automatic binning module of FIG. 3. In the example depicted in FIG. 5, the table 502 can include bins 504, 506 associated with a predictor variable 508. Each bin 504, 506 can include a set of data or output values (e.g., dependent variables corresponding to the columns in table 502) that correspond to an input value of the predictor variable 508, which can be used as an independent variables (e.g., an input value of the predictor variable 508 in the first column of table 502). In some aspects, the automated model development tool can collapse or combine the bins 504, 506 based on a degree of similarity between the bins 504, 506. In some aspects, the automated model development tool can receive data indicating a threshold degree of similarity (e.g., from a computing device or indicia of user input) and the automated model development tool can combine bins 504, 506 if the bins 504, 506 are sufficiently similar based on the threshold degree of similarity. As an example, a graphical user interface can be presented to a user of the automated model development tool, which can allow the user to provide the threshold degree of similarity. The automated model development tool can combine bins 504,506 if the bins are sufficiently similar and an updated user interface can be presented to the user that indicates that the bins 504,506 are combined.

In the example depicted in FIG. 5, the automated model development tool can calculate various output variables associated with the predictor variable 508. For instance, the automated model development tool can calculate chi-square and p-values for consecutive bins in table 502 (e.g., the bins 504, 506) as shown in FIG. 5. In some aspects, two adjacent or consecutive bins having respective p-values above a threshold can indicate a sufficient degree of similarity between the bins such that the automated model development tool combines the adjacent bins. In such examples, the threshold degree of similarity can be based on the value for "pval" in table 502 (e.g., a value of 0.2 for pval). As depicted in FIG. 5, the maximum pval values for bins in table 502 is 0.964, which is associated with bins 504, 506. The automated model development tool can combine bins 504, 506 based on the value for "pval" associated with bins 504, 506 exceeding the threshold degree of similarity (e.g., exceeding 0.2).

In some aspects, prior to collapsing bins 504 and 506, the bin 504 can include a range of values of the predictor variable 508 from 3,380 to 5,278 and a corresponding chi-square value of 10.717 as indicated in table 502. The bin 506 can include a range of values of the predictor variable 508 from 5,279 to 7,723 and a corresponding chi-square value of 0.002. The automated model development tool can collapse (e.g., combine) bins 504, 506. Collapsing the bins 504, 506 can combine the ranges of values of the predictor variable 508 and the chi-square values of the bins 504, 506 into a single bin. For example, as shown in FIG. 6, bins 504, 506 of FIG. 5 can be combined to form bin 604, which can include the range of values of the predictor variable 508 from 3,380 to 7,723 (e.g., the combined range of values of bins 504 and 506 of FIG. 5) and a corresponding chi-square value of 13.685. In this manner, bin 604 includes combined values of predictor variable 508 and combined chi-square values from bins 504 and 506 of FIG. 5.

In the example depicted in FIG. 6, bins 504 and 506 of FIG. 5 have been combined to form bin 604 of FIG. 6. After combining the bins 504, 506 into the bin 604, the automated model development tool can subsequently execute the automatic binning operation to determine two adjacent or consecutive bins having respective p-values above the threshold. As an example, the automated model development tool can determine that the maximum pval values associated with bins 606 and 608 is 0.0.646, which is above the threshold degree of similarity (e.g., above 0.2). The automated model development tool can combine bins 606, 608 based on the value for pval associated with bins 606, 608 exceeding the threshold degree of similarity.

In some aspects, the automated model development tool can iterate this binning process. The iteratively executed binning process can reduce the complexity of one or more predictor variables. The iteratively executed binning process can also increase a predictive strength of the one or more predictor variables by collapsing similar bins into a common bin.

For instance, FIG. 7 is a table showing an example of data associated with the automatic binning operations of FIGS. 5 and 6. In the example depicted in FIG. 7, the automated model development tool can collapse bins in an iterative manner, and can cease iteration based on determining that all p-values in the table are less than a threshold p-value (e.g., less than 0.2). The result of the iterative process can be a smaller number of bins having a sufficiently large degree of difference among them. For example, as depicted in FIG. 7, the seventeen bins of FIG. 5 can be collapsed into eleven bins, with each pair of adjacent bins having p-values less than the threshold p-value of 0.2.

Returning to FIG. 4, in some aspects, automatically combining data in block 406 can include automatically smoothing the various bins of the predictor variable (e.g., by using the automatic binning module 312 of FIG. 3). For example, the automated model development tool can automatically smooth the various bins of the predictor variable 508 of FIGS. 5 and 6. Automatically smoothing the bins can include further combining various bins of the predictor variable to create a monotonic sequence of bins of the predictor variable.

Figure 8:
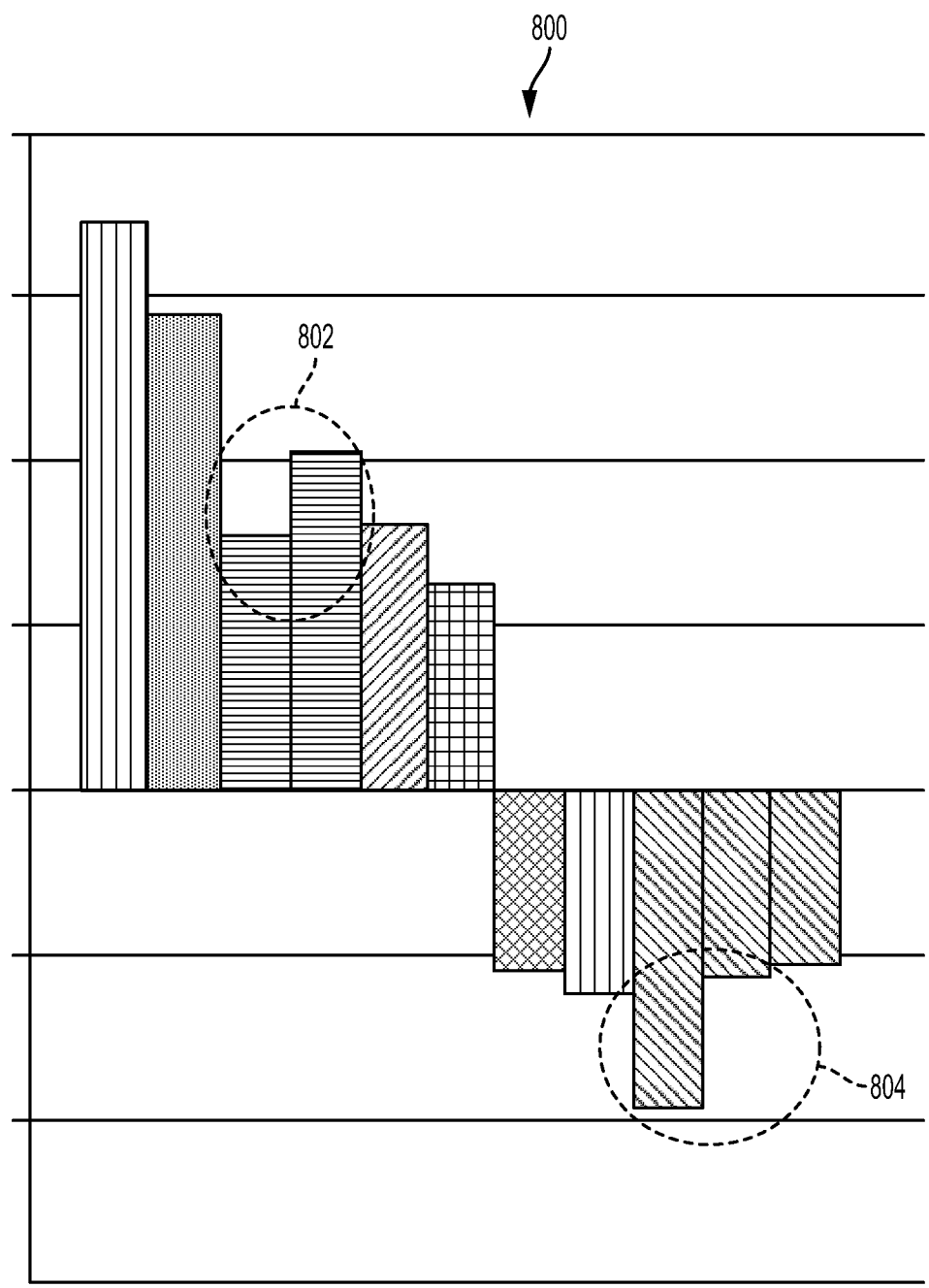
FIG. 8 is a graph depicting an example of automatically smoothing various bins of a predictor variable using an automatic binning module of FIG. 3, according to certain aspects of the present disclosure.
Figure 9:
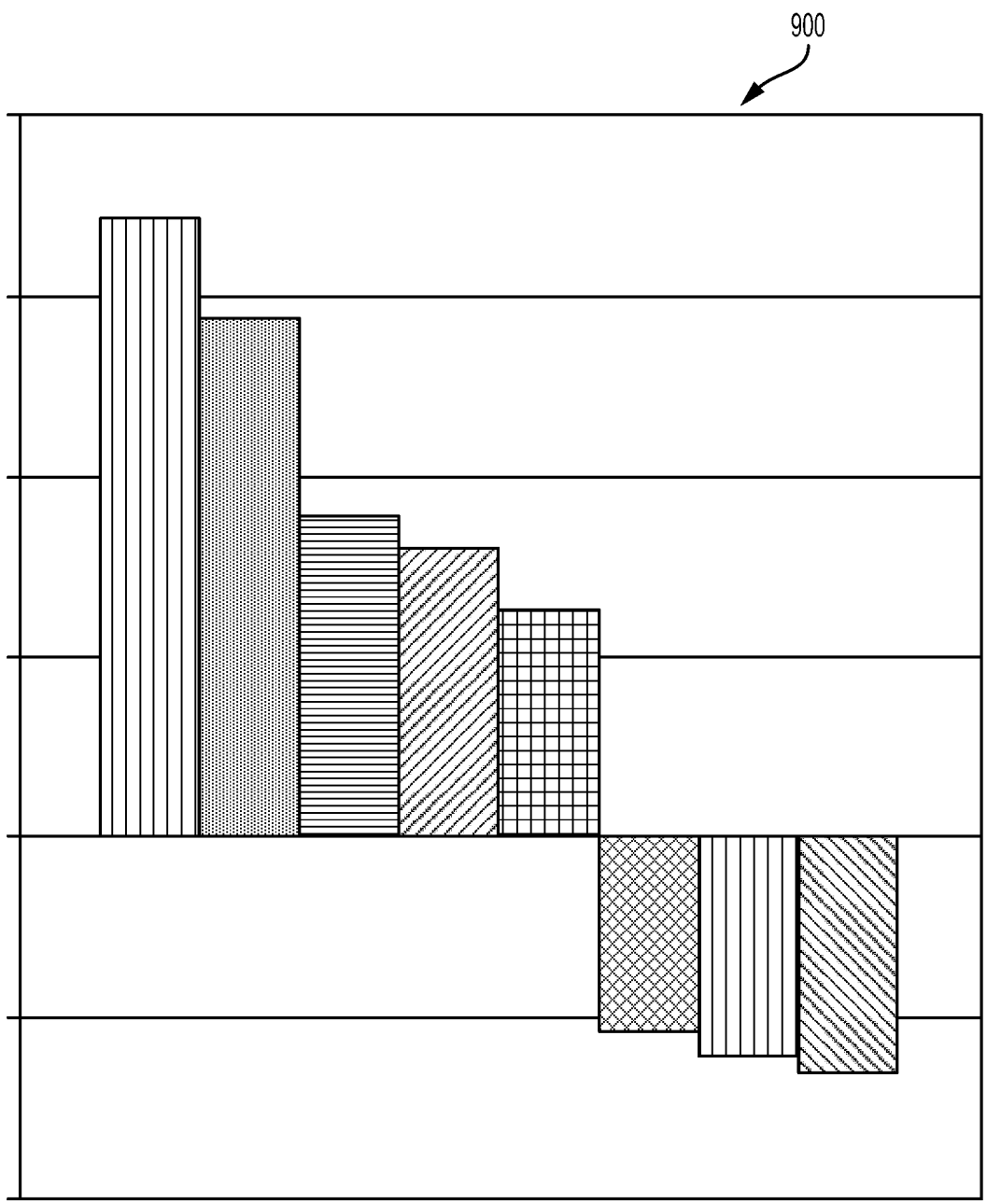
FIG. 9 is a graph depicting another example of automatically smoothing various bins of a predictor variable using the automatic binning module of FIG. 3, according to certain aspects of the present disclosure.

For instance, FIGS. 8 and 9 depict graphs 800, 900 that provide an example of automatically smoothing various bins of a predictor variable. In the example depicted in FIG. 8, a set of eleven bins (e.g., bins represented by each bar in the graph 800) includes at least two sets of bins 802, 804 in which the trends are not monotonic (e.g., a trend associated with odds indices of the sets of bins 802, 804 is not monotonic as compared to a trend of the other bins). The automated model development tool can collapse the subset of the eleven groups that are not monotonic (e.g., collapse bins 802, 804), which can form eight monotonic bins that are sufficiently distinct from each other. For example, FIG. 9 shows graph 900 in which there is a monotonic trend between the various bins.

In some aspects, automatically smoothing the various bins can include increasing a monotonicity based on a sign of a correlation between a predictor variable (e.g., the predictor variable 508 of FIGS. 5 and 6) and an output variable (e.g., an odds index). For instance, FIG. 10 depicts a table for another example of automatically smoothing various bins of a predictor variable using the automatic binning module of FIG. 3. In the example depicted in FIG. 10, the automated model development tool can calculate an output variable "odds_diff," which can be dependent on a predictor variable 1001 (e.g., a predictor variable "bal3"). In some aspects, the odds_diff variable can be a difference of an odds index between two consecutive bins.

For example, the odds index for a bin 1004 minus the odds index for bin 1002 is −0.558, which is the odds_diff for bin 1004 as shown in FIG. 10. As another example, the odds index for bin 1006 minus the odds index for bin 1004 is −1.339, which is the odds_diff for bin 1006 as shown in FIG. 10. In some aspects, the odds_diff variable having a constant sign throughout the various bins (e.g., a constant positive or negative sign) can indicate a monotonic sequence between the various bins. For example, most bins depicted in the FIG.

10 are associated with a negative sign for the odds_diff output variable, but some bins (e.g., bins 1008, 1010) are associated with a positive sign for the odds_diff variable. This may indicate that a monotonic sequence does not exist among the various bins.

Bins associated with a positive sign for the odds_diff variable (e.g., bins 1008, 1010) can be collapsed based on being associated with a different sign for the odds_diff variable as compared to the other bins. In the example depicted in FIG. 10, the largest absolute value for odds_diff is 0.802 for bin 1008. In some aspects, the automated model development tool can collapse bin 1008 into bin 1009 (e.g., by using the automatic binning module 312 to combine bin 1008 and bin 1009) to create a bin associated with a negative sign for the odds_diff variable. This process can be iterated until all bins with positive signs for odds_diff have been collapsed, such that a monotonic sequence is obtained among the various bins.

In some aspects, automatically combining data associated with the predictor variable as described above can allow the use of a logistic regression or any function to develop an analytical model using the automated model development tool. Certain models, such as (but not limited to) models developed using logistic regression, may require monotonicity for the various bins of the predictor variable. In some aspects, the automated model development tool can automatically combine various bins associated with various predictor variables as described above, such that monotonicity exists between the various bins. This monotonicity exists between the various bins can allow the automated model development tool to use the predictor variables to develop the analytical model using a logistic regression or other suitable function.

Returning to FIG. 4, in some aspects, automatically combining data in block 406 can include creating a neutral group (e.g., using the automatic binning module 312 of FIG. 3). For example, FIG. 11 is a table depicting an example of a neutral group creation operation.

In the example depicted in FIG. 11, the automated model development tool can create a neutral group. The neutral group can be a bin having less predictive strength than other bins. In some aspects, if a predictor variable has N bins, it may be desirable to include N−1 dummy indicators as independent variables for a model being developed using the automated model development tool. For example, in the example depicted in FIG. 11, a predictor variable 1104 (e.g., the predictor variable "bal3") can have eight bins 1102, 1106, 1108, 1110, 1112, 1114, 1116, 1118. In some aspects, it may be desirable to include seven dummy indicators in the model being developed by the automated model development tool. The bin for which a corresponding dummy indicator is not generated can be identified as a neutral group.

In some aspects, to identify a neutral group, the automated model development tool can identify one or more bins between bins 1102, 1106, 1108, 1110, 1112, 1114, 1116, 1118 that satisfy a first condition indicating that the identified bin lacks sufficient predictive strength. For example, the first condition can be that a value of an output variable associated with a bin (e.g., percent of total) accounts for more than a threshold percentage (e.g., 50%) of the total data associated with the various bins. If a bin satisfies the condition, the automated model development tool can select the bin as the neutral bin. If none of the bins 1102, 1106, 1108, 1110, 1112, 1114, 1116, 1118 satisfies the first condition, the automated model development tool can identify one or more bins that satisfy a second condition. For example, the second condition can be that another output variable associated with a bin is within a range (e.g., an interval bad rate/total bad rate between 0.9 and 1.1). If a bin satisfies the second condition, the bin can be selected as the neutral bin. If none of the bins 1102, 1106, 1108, 1110, 1112, 1114, 1116, 1118 satisfies the second condition, the automated model development tool can select the largest bin as the neutral bin. In the example depicted in FIG. 11, the bin 1102 satisfies the first condition (e.g., has a value associated with the percentage of the total that is more than a threshold percentage of 50%) and the automated model development tool can identify bin 1102 as the neutral bin.

Returning to FIG. 4, in block 408, a number of predictor variables in the data set is reduced by selecting a subset of predictor variables in the data set based on a predictive strength of each predictor variable in the subset. In some aspects, the automated model development tool automatically reduces the amount of predictor variables (e.g., using the variable reduction module 318). For example, the automated model development tool can execute a variable reduction operation. The variable reduction operation can include identifying subsets of predictor variables having a threshold level of predictive strength.

For example, the automated model development tool can execute one or more parallel algorithms to identify predictor variables having a threshold level of predictive strength. Examples of the parallel algorithms include, but are not limited to, a correlation analysis algorithm (e.g., based on the CORR procedure from SAS) that is used to determine if a possible linear relationship exists between two variables, a stepwise discriminate analysis algorithm (e.g., based on the STEPDISC procedure from SAS), a genetic algorithm (e.g., an algorithm that can imitate an evolutionary process or a non-linear stochastic-based search or optimization algorithm). One example of a variable reduction algorithm that can be used at block 408 is described herein with respect to FIG. 15. In some aspects, the automated model development tool can execute the parallel algorithms to identify predictor variables having the threshold level of predictive strength and combine or de-duplicate the identified predictor variables after the predictor variables are identified. The automated model development tool can remove or exclude predictor variables that do not have the threshold level of predictive strength (e.g., predictor variables that are not included in the identified sets of predictor variables) from the data set.

In block 410, an analytical model is developed based on the combined data of the selected subset of predictor variables (e.g., in blocks 406 and 408). In some aspects, the automated model development tool automatically generates, modifies, selects, or develops the analytical model. In some aspects, the automated model development tool uses the predictor variables having the threshold level of predictive strength identified in block 408 of FIG. 4 to automatically develop the analytical model. In another aspect, the automated model development tool uses any predictor variable in the data set obtained by the automated model development tool (e.g., in block 402) to automatically develop the analytical model.

In some aspects, the analytical model can be used in various machine-learning applications. An example of a machine-learning application is identifying or determining a relationship between the various predictor variables and one or more output variables. An output variable can correspond to a probability associated with an entity (e.g., a probability of the entity performing a task, such as, for example, defaulting on a financial obligation or responding to a sales offer, or a probability of the entity meeting a criteria, such as, for example, being approved for a loan). In some aspects, the output variables can be dependent variables (e.g., dependent on the predictor variables).

Figure 12:
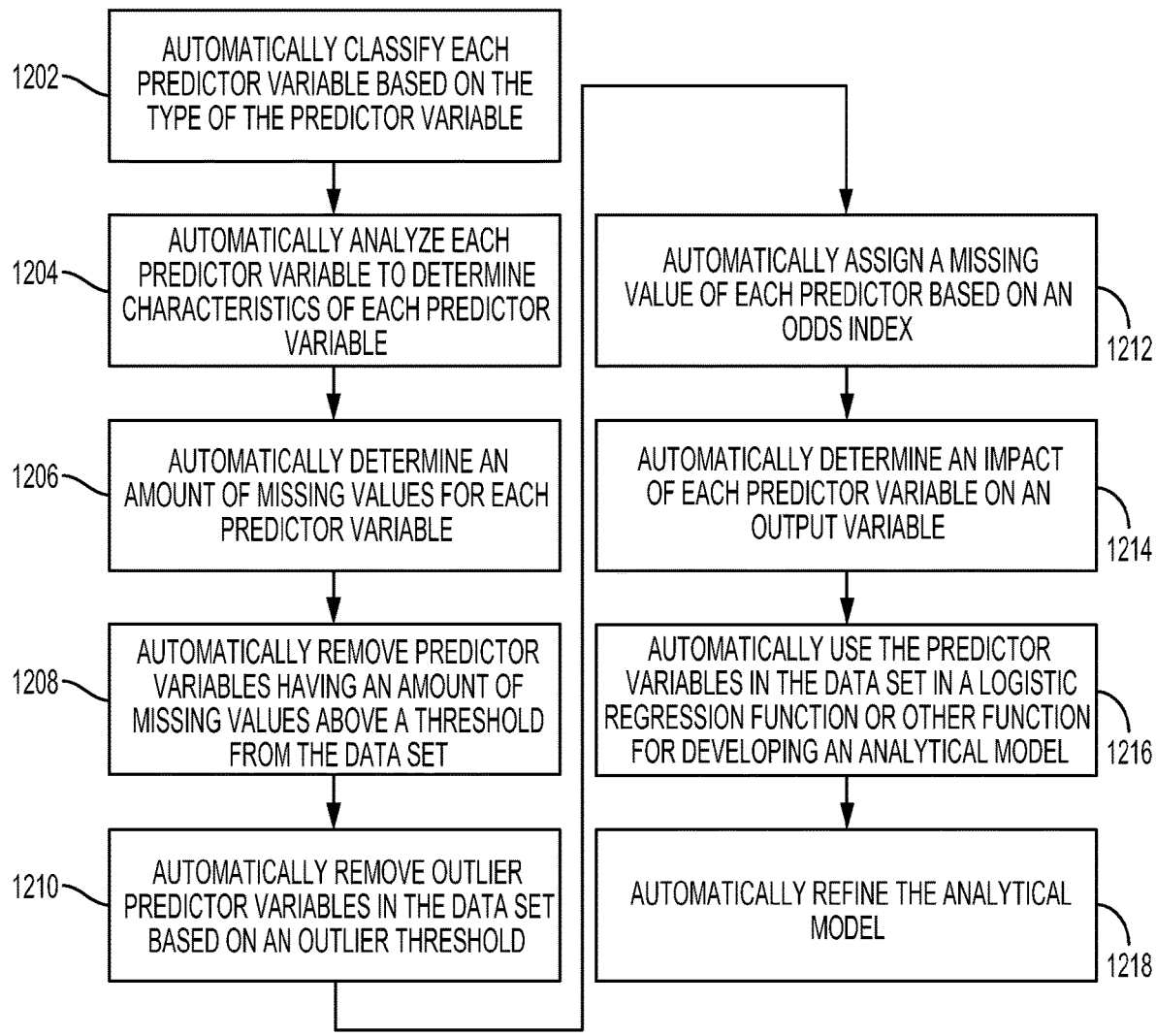
FIG. 12 is a flow chart depicting an example of a process for automatically developing the analytical model of FIG. 4 using an automated model development tool, according to certain aspects of the present disclosure.

In some aspects, the automated model development tool can perform various automated operations (e.g., using modules 302-322 of FIG. 3) to automatically generate, modify, select, or develop the analytical model. For example, FIG. 12 is a flow chart depicting an example of a process for automatically developing the analytical model of FIG. 4 using an automated model development tool. The flow chart depicted in FIG. 12 includes various additional or alternative operations (e.g., in addition to operations described with respect to FIG. 4) that can be performed by the automated model development tool to automatically develop the analytical model.

In block 1202, predictors variable in a data set are automatically classified (e.g., grouped) based on the type of the predictor variable. In some aspects, the automated model development tool can classify each predictor variable in a data set obtained by the automated model development tool (e.g., in block 402 of FIG. 4). In some aspects, the automated model development tool can classify each predictor variable (e.g., using the variable analysis module 302 of FIG. 3). For example, the automated model development tool can group numerical predictor variables together or group character predictor variables together.

In some aspects, certain predictor variables may be excluded from a classification operation performed at block 1202. For example, the automated model development tool may receive data from a computing device (e.g., an indicia of user input), where the data indicates that one or more predictor variables should not be classified by the automated model development tool. The automated model development tool may exclude the one or more predictor variables from being classified based on the data received.

In some aspects, in block 1202, the automated model development tool may output data associated with analyzing or classifying the predictor variables. As an example, the automated model development tool may output a report, list, chart, etc., that indicates predictor variables that are classified as numeric predictor variables or a predictor variables that are classified as character predictor variables. As an example, the automated model development tool can output a list that includes numeric predictor variables and a list that includes character predictor variables.

In block 1204, each predictor variable is automatically analyzed to determine characteristics of each predictor variable. In some aspects the automated model development tool can analyze each predictor variable (e.g., using the exploratory data analysis module 304 of FIG. 3) to be used for developing a model (e.g., predictor variables that have been classified at block 1202). For example, the automated model development tool can perform exploratory data analysis, which includes performing various operations on the predictor variables for analyzing the predictor variables. In some aspects, the automated model development tool can perform the exploratory data analysis to determine and summarize characteristics of each predictor variable.

For example, the automated model development tool can analyze one or more predictor variables to determine an odds index or a good/bad ration associated with the analyzed predictor variable. The odds index indicates a ratio of positive or negative outcomes associated with the predictor variable. As an example, for each predictor variable, if a percentage of good or positive outcomes is greater than a percentage of bad or negative outcomes, the automated model development tool can determine the odds index based on the following equation:

$$\text{odds index} = \frac{\text{percentage of goods}}{\text{percentage of bads}}$$

where the percentage of "goods" corresponds to the percentage of positive outcomes and the percentage of "bads" corresponds to the percentage of negative outcomes As another example, for each predictor variable, if a percentage of positive outcomes is less than a percentage of negative outcomes, the automated model development tool can determine the odds index based on the following equation:

$$\text{odds index} = -\frac{\text{percentage of bads}}{\text{percentage of goods}}$$

In some aspects, the automated model development tool can perform the exploratory data analysis to determine a bivariate correlation or trend associated with each of the predictor variables based on an odds index of each predictor variable. In some aspects, the bivariate relationship associated with each of the predictor variables can be used to determine (e.g., quantify) a predictive strength of each of the predictor variables with respect to the odds index. The predictive strength of the predictor variable indicates an extent to which the predictor variable can be used to accurately predict a positive or negative outcome or a likelihood of a positive or negative outcome occurring based on the predictor variable. In another example, the predictive strength of the predictive variable indicates an extent to which the predictor variable can be used to accurately predict an output variable.

In some aspects, in block 1204, the automated model development tool may output data associated with the exploratory data analysis (e.g., using the exploratory data analysis module 304 of FIG. 3). As an example, the automated model development tool may output a report, list, chart, etc., that indicates characteristic of a predictor variable.

For instance, FIGS. 13A-C depict examples of data that can be output using the exploratory data analysis module 304 of FIG. 3. In the example depicted in FIG. 13A, table 1300 includes results of an exploratory data analysis on a predictor variable "ioldest." Table 1300 includes a summary 1301 of statistics for the predictor variable and characteristics for each bin associated with the predictor variable (e.g., rows 1 to 17 of data in FIG. 13A). Each bin can include a set of data or output values (e.g., dependent variables corresponding to the columns in table 1300) that correspond to a range of input values of the predictor variable, which can be used as an independent variables (e.g., a range of values of the predictor variable in the first column of table 1300). As an example, bin 2 can include output values (e.g., #Total, % of total, #of bads, % of bads, etc.) that correspond to a range of values (e.g., 0 to 26) of the predictor variable "ioldest." As depicted in table 1300, each bin can have a corresponding odds index, which can be determined by the automated model development tool (e.g., using the exploratory data analysis module 304 of FIG. 3).

In the example depicted in FIGS. 13B and 13C, the automated model development tool may output one or more tables 1302, 1304 associated with the exploratory data analysis on the predictor variable "ioldest." For example, the table 1302 in FIG. 13B can include data corresponding to a bad rate (e.g., data points 1306, 1308, 1310). The bad rate can correspond to a rate of negative outcomes associated with the predictor variable "ioldest" (e.g., negative outcomes determined using the exploratory data analysis module 304). As an example, data point 1306 in FIG. 13B is associated with row or bin 2 in table 1300 of FIG. 13A and corresponds to a bad rate of approximately 29.62%, which is the bad rate of bin 2 as depicted in table 1300 of FIG. 13A. As another example, the data point 1308 of FIG. 13B is associated with row or bin 3 of FIG. 13A and corresponds to a bad rate of approximately 33.18%, which is the bad rate of bin 3 as depicted in table 1300 of FIG. 13A. In some aspects, the bad rate can indicate how a rate of negative outcomes associated with the predictor variable "ioldest" changes across the various bins (e.g., how the rate of negative outcomes associated with the predictor variable changes based on the range of values of the predictor variable). In the example depicted in FIG. 13B, the table 1302 also includes data corresponding to a percentage of the total (e.g., data points 1312, 1314, and 1316), which indicates a percentage of total bins that is represented by each bin of table 1300 of FIG. 13. As another example, the automated model development tool may output table 1304 of FIG. 13C, which includes data corresponding to a frequency distribution of the predictor variable "ioldest."

Returning to FIG. 12, in block 1206, an amount of missing values or data for each predictor variable is automatically determined. A missing value can be a value associated with a predictor variable that is unavailable (e.g., if an entity has not engaged in any trades or if one or more trades by the entity are excluded from the data set). As an example, missing data can include data associated with the predictor variable "ioldest" of FIG. 13 for which data or a value is unavailable (e.g., row or bin 1 of table 1300 of FIG. 13).

In some aspects, the automated model development tool 102 can determine the amount or percent of missing values or data for each predictor variable (e.g., using the missing data module 306 of FIG. 3). For example, the automated model development tool 102 can determine the amount of missing values for each predictor variable by tabulating the amount of missing values for each predictor variable. The automated model development tool 102 can use this tabulation to determine the percentage of missing values for each of the predictor variables.

In block 1208, the automated model development tool automatically removes predictor variables having an amount of missing values or a percent of missing values above a threshold from the data set. For example, the automated model development tool can determine the percentage of missing values for each predictor variable (e.g., in block 1206) and receive data (e.g., from a computing device or an indicia of user input) that indicates a missing percentage threshold. The automated model development tool can exclude or remove predictor variables from the data set that have a percentage of missing values above the missing percentage threshold.

In some aspects, in block 1208, a missing value indicator is automatically generated for missing values of each predictor variable having an amount of missing values below the missing percentage threshold. In some aspects, the automated model development tool can automatically generate the missing value indicator (e.g., using the missing data module 306 of FIG. 3), which can indicate that a value or data for the predictor variable is unavailable.

In block 1210, outlier predictor variables are automatically removed from the data set based on an outlier threshold. In some aspects, the automated model development tool can automatically remove outlier predictor variables (e.g., using the outlier data module 308 of FIG. 3). For example, the automated model development tool can perform capping and flooring operations on the predictor variables to remove outlier predictor variables, which can include removing predictor variables associated with data that is above a maximum threshold or removing predictor variables associated with data that is below a minimum threshold.

As an example, the data set may include predictor variables associated with a set of entities (e.g., income information from a set of individuals or other entities). The median income for individuals in the data set may be $30,000 per year, but certain individuals in the data set may have incomes greatly exceeding the median (e.g., $100 million per year) or far below the median (e.g., $500 per year). The individuals in the data set having incomes greatly exceeding the median or far below the median can be outliers in the data set. For example, the individuals in the data set having incomes below a minimum threshold of $5,000 per year and the individuals in the data set having incomes above a maximum threshold of $100,000 per year can be outliers in the data set. The automated model development tool can adjust these outliers to reduce a negative impact of these outliers on the accuracy of the predictions provided by an analytical model that is generated, modified, selected, or developed using the automated model development tool. As an example, the automated model development tool can adjust the data set such that income values for individuals having incomes below the minimum threshold of $5,000 per year is set or floored at $5,000 (e.g., the automated model development tool replaces incomes below $5,000 with a value of $5,000). As another example, the automated model development tool can adjust the data set such that income values for individuals having incomes above the maximum threshold of $100,000 per year is set or capped at $100,000 (e.g., the automated model development tool replaces income values above $100,000 with a value of $100,000).

In block 1212, missing values of each predictor variable are automatically assigned based on an odds index. In some aspects, the automated model development tool can automatically assign the missing values (e.g., using the value assignment module 310 of FIG. 3). For example, the automated model development tool can assign a bin of a predictor variable that has missing values to another bin of the predictor variable that has available values. Assigning the bin having missing values to another bin having available values can include combining the bins into a single bin. In some aspects, the automated model development tool can assign the bin having missing values to another bin having available values based on a similarity between a characteristic of the bins (e.g., a similarity between odds indices of the bins).

For instance, FIG. 14 depicts a table 1400 with an example of assigning missing values associated with a predictor variable using the value assignment module 310 of FIG. 3. In the example depicted in FIG. 14, predictor variable 1402 (e.g., a predictor variable B1) can have missing values 1404, 1406, 1408, 1410, for various bins associated with the predictor variable 1402 (e.g., bin 1, bin 2, bin 3, bin 4 in table 1400, respectively). In this example, the bins associated with the missing values 1404, 1406, 1408, 1410 (e.g., bin 1, bin 2, bin 3, bin 4 in table 1400, respectively), can each have a corresponding odds index of −2.35, −2.25, 1.32, and 1.21 respectively as shown in table 1400. The automated model development tool can compare (e.g., using the value assignment module 310 of FIG. 3) the odds index value associated with bins of each of the missing values 1404, 1406, 1408, 1410, to odds indices of other bins associated with the predictor variable 1402 (e.g., the odds indices of bin 5 or bin 6 in table 1400). The automated model development tool can automatically assign the bins associated with the missing values 1404, 1406, 1408, 1410 to other bins having available values based on the comparison (e.g., using the value assignment module 310 of FIG. 3).

As an example, the automated model development tool can determine that bin 1 and bin 2 respectively associated with the missing values 1404 and 1406 each have a corresponding odds index closest to −2.20, which is the odds index value for bin 5 in table 1400. The automated model development tool can automatically assign bins 1 and 2 associated with the missing values 1404, 1406 to bin 5 based on this determination, which can include combining bins 1 and 2 with bin 5. As another example, the automated model development tool can determine that the bin 3 and bin 4 associated with missing values 1408 and 1410 each have a corresponding odds index closest to 1.42, which is the odds index value for bin 6 in table 1400. The automated model development tool can automatically assign bins 3 and 4 to bin 6 based on this determination, which can cause bins 3 and 4 to be combined with bin 6. In some aspects, for a missing value that is in a range that includes multiple bins (e.g., row or bin 9 of table 1400), the automated model development tool can assign a bin associated with the missing value to a bin at the median of the range.

The automated model development tool can assign a missing value based on an odds index and a distribution of missing values as described above. This process can obviate or reduce the need for reassigning missing values in a data set by replacing a missing value with a zero value, a mean value, or a median value for the data set.

Returning to FIG. 12, in block 1214, an impact of each predictor variable on an output variable is automatically determined. In some aspects, the model development tool automatically determines an impact of each predictor variable on one or more output variables (e.g., using the correlation analysis module 316 of FIG. 3). In some aspects, the automated model development tool determines the impact of each predictor variable on an output variable by determining a degree to which a predictor variable affects an output variable.

In some aspects, in block 1214, the automated model development tool determines an impact of a predictor variable on one or more other predictor variables. In some aspects, the impact of a predictor variable on another predictor variable can indicate a correlation between the predictor variable and the other predictor variable, which can be used for reference purposes.

In block 1216, the predictor variables in the data set are automatically used in a logistic regression function or other function for developing an analytical model. In some aspects, the automated model development tool uses the predictor variables in the data set (e.g., the predictor variables having the threshold level of predictive strength identified in block 408 of FIG. 4 or any predictor variables in the data set) in the logistic regression function or other function (e.g., using the regression model module 320). In some aspects, the automated model development tool can use the predictor variables in any type of function or model. In some aspects, the automated model development tool can use the predictor variables in the data set to develop an analytical model, which can be a statistically sound analytical model.

In block 1218, the analytical model is automatically refined. In some aspects, the automated model development tool automatically refines the analytical model (e.g., using the model refining module 322). For example, the automated model development tool can determine and evaluate one or more statistics or data related to the analytical model developed using the automatic model development tool (e.g., the model developed in block 1216). Examples of the statistics include, but are not limited to, p-values, signs, a variance inflation factor, or Wild chi-square statistics. In some aspects, the automated model development tool can tune or adjust the analytical model based on the one or more statistics to improve a degree to which the analytical model provides outputs that correspond to a real-world scenario.

In some aspects, in block 1218, the analytical model is finalized. In some aspects, the automated model development tool can finalize the analytical model (e.g., using the model completion module 324). For example, the automated model development tool can use the analytical model to output data. As an example, the automated model development tool can use the analytical model to generate and output a gains chart (e.g., a chart indicating a measure of an effectiveness of the analytical model), one or more reports, or a model equation associated with the analytical model. In other examples, the automated model development tool can use the analytical model for various machine learning applications, including, for example, identifying relationships between sets of predictor variables and one or more output variables.

FIG. 15 is a flow chart depicting an example of a genetic algorithm that can be used by the variable reduction module of FIG. 3 to identify sets of predictor variables having a threshold level of predictive strength. The genetic algorithm depicted in FIG. 15 can be used to implement block 408 depicted in FIG. 4.

In block 1502, a population is initialized. In some aspects, initializing the population can include randomly selecting multiple predictive models. For each of the selected models, the automated model development tool can randomly select a respective subset of independent variables (e.g., predictor variables) from a set of independent variables available for a data set. For example, a data set used to develop the model may include 500 predictor variables associated with individuals or other entities, and these 500 predictor variables can be used as independent variables. For a first model, a first subset of 20 predictor variables out of the 500 predictor variables can be selected. For a second model, a second subset of 20 predictor variables out of the 500 predictor variables can be selected.

In block 1504, each selected model is evaluated. In some aspects, the automated model development tool can determine a Kolmogorov-Smirnov ("KS") test value for each selected model using the respective set of dependent variables (e.g., output variables). The KS value for a model with a given set of predictor variables can indicate the degree to which the model with the given set of predictor variables accurately predicts the output variables in the sample data set.

In block 1506, a model is selected. In some aspects, the automated model development tool can select the model. For example, the automated model development tool can select model-variable subset combinations for a "crossover" stage after ranking all the models by KS test value. In some aspects, predictor variables in each model can be ranked. As an example, predictor variables in each model can be ranked based on Wald Chi-squared statistics associated with each predictor variable. In such examples, the predictor variables can be ranked in order from the predictor variable with the highest predictive strength (e.g., having the highest Wald Chi-squared statistic) to the predictor variable with the lowest predictive strength (e.g., having the lowest Wald Chi-squared statistic). The selection, crossover, and mutation operations can be one complete iteration (e.g., one generation). A threshold KS test value is used as a condition for exiting the iterations when at least one model-variable subset with KS greater than the threshold emerges. The iterations can also terminate if a pre-defined maximum number of allowed iterations is reached before any model reaches the threshold KS test value.

In block 1508, predictor variables are crossed over between selected models (e.g., in block 1506). In some aspects, the automated model development tool can cross over the predictor variables between two or more selected models. For example, a first model using a first subset of predictor variables may have the largest KS test value (e.g., the KS test value determined in block 1504) and a second model using a second subset of predictor variables may have the second largest KS test value. In block 1508, the automated model development tool can select a subset of predictor variables from the second model to swap with a subset of predictor variables in the first model. The predictor variable swapping in block 1508 results in two new models that will be re-evaluated for predictive performance in the next iteration. In some aspects, crossing over predictor variables between selected models includes swapping an even number of predictor variables between a pair of selected models. As an example, the automated model development tool can swap ten predictor variables from a first model (e.g., the model having the highest KS test value or another selected model) with ten predictor variables from a second model (e.g., the model having the second largest KS test value or another selected model). As another example, predictor variables can be swapped between one or more selected models and the model having the highest KS test value. As still another example, predictor variables can be swapped between any of the selected models. In some aspects, a probability of performing the crossover between a selected model and a model having the highest KS test value can be based on user input. For example, the automated model development tool can receive data (e.g., from the computing device 109, the user device 108, or any other device) or user input. The received data or user input can indicate the probability of performing the crossover with the model having the highest KS test value. In some aspects, a crossover point can be randomly selected by the automated model development tool.

In some aspects, in each iteration, a model having the largest KS test value (e.g., the KS test value determined in block 1504) may not be included in the cross-over step. For example, the automated model development tool may not select a subset of predictor variables from the model having the largest KS test value to swap with another model. In some aspects, the model having the largest KS test value may be excluded from the cross-over step until another model has a higher KS test value (e.g., as determined in block 1504).

In block 1510, a selected model is mutated (e.g., a model selected in block 1506). In some aspects, the automated model development tool can mutate the selected model. In some aspects, after cross-over (e.g., in block 1508), each new model can undergo "mutation" with a user defined probability. A model chosen for "mutation" can have up to a user-defined maximum percentage of the total number of predictor variables swapped out for other predictor variables from the master list of 500 predictor variables. This operation can expand the space of possible predictor variable-subset combinations that the genetic algorithm will explore.

In block 1512, the automated model development tool can determine if a termination criterion is satisfied. The automated model development tool can iterate the genetic algorithm (e.g., return to block 1504) if the termination criterion is not satisfied. If the termination criterion is satisfied, the automated model development tool can terminate the genetic algorithm and output a solution set (e.g., in block 1514). For example, in block 1514, the genetic algorithm may be terminated if all subsets of predictor variables models provide similar levels of predictive strength or one of the models reaches the threshold level of predictive strength after being crossed-over to one or more additional predictive models (e.g., in block 1508). The subset of predictor variables can be the solution set.

In some aspects, the automated model development tool described herein can be used with various user applications to develop an analytical model. For example, FIG. 16 is a flow chart depicting an example of a process for using an automated model development tool with a user application (e.g., a SAS application) to develop an analytical model for identifying a relationship between sets of predictor variables and one or more output variables.

In block 1602, a configuration file is modified. In some aspects, a user can modify one or more parameters of a configuration file that is used by the automated model development tool.

In block 1604, program code that includes macros is executed. In some aspects, the automated model development tool can be implemented using program code that can be executed by one or more processing devices. The program code can include code that defines one or more macro functions. The macro functions can include, but are not limited to, variable type analysis, exploratory data analysis, or any other function or operation executable by the automated model development tool using modules 302, 304, 306, 308, 310, 312, 314, 316, 318, 320, 322, 324 of FIG. 3. In some aspects, executing the program code can cause the automated model development tool to develop an analytical model that can be used to identify a relationship between sets of predictor variables and one or more output variables.

In block 1606, data is outputted. In some aspects, the automated model development tool can generate or output data. For example, the automated model development tool can output data based on execution of program code by a processing device (e.g., execution of one or more operations using any of modules 302, 304, 306, 308, 310, 312, 314, 316, 318, 320, 322, 324 of FIG. 3). Examples of data that can be generated and output include, but are not limited to, a model equation or set of model equations, an exploratory data analysis report (e.g., using the exploratory data analysis module 304 of FIG. 3), automatically binning analysis report (e.g., using the automatic binning module 312 of FIG. 3), a gains chart or a set of gains chart, etc.

In some aspects, suitable program code (e.g., an SAS driver program) can perform operations defined in a configuration macro and one or more main macros (e.g., macros corresponding to the operations executed by any of modules 302, 304, 306, 308, 310, 312, 314, 316, 318, 320, 322, 324 of FIG. 3). In some aspects, one or more of the main macros can include additional sub-macros. For example, in one implementation, 42 SAS and Python files may be used to implement the automated model development tool and associated programs.

In some aspects, the use of the automated model development tool can reduce a number of required inputs from a user. In one example, a user may modify an input file including configuration parameters (e.g., by modifying a file used to specify parameters for the model development tool), instruct a suitable application to execute a driver program (e.g., select a particular SAS file for execution), and select one or more input files with one or more of data sets and entity attributes (e.g., predictor variables associated with the entity) used by the automated model development tool. The automated model development tool can allow users to input, select, or otherwise set modelling criteria. For example, a user may set different modeling criteria such as chi square values, p-values, etc. User-provided values for these criteria can change the model that is generated using the automated model development tool.

In some aspects, a model developed using the automated model development tool may have an improved Kolmogorov-Smirnov ("KS") test score as compared to a manually developed model. For example, FIG. 17A is a table 1702 depicting a performance of a model developed using the automated model development tool on a sample data set and FIG. 17B is a table 1704 depicting a performance of a manually developed model on the sample data set. In the example depicted in FIG. 17A, the table 1702 includes data about the performance of an analytical model developed using the automated model development tool. The table 1702 can indicates a KS test score for the model developed using the automated model development tool, which is 67.50. In the example depicted in FIG. 17B, the table 1704 includes data about a performance of a manually developed model (e.g., a model not developed using the automated model development tool). The table 1704 indicates the KS test score for the manually developed model, which is 66.05. As shown in FIGS. 17A and 17B, the KS test scores for the model developed using the automated model development tool can indicate an improved performance of an analytical model developed using the automated model development tool as compared to a manually developed model.

Any suitable device or set of computing devices can be used to execute the automated model development tool described herein. For example, FIG. 18 is a block diagram depicting an example of an automated model development server 104 (e.g., the automated model development server 104 of FIG. 1) that can execute an automated model development tool 102. Although FIG. 18 depicts a single computing system for illustrative purposes, any number of servers or other computing devices can be included in a computing system that executes an automated model development tool 102. For example, a computing system may include multiple computing devices configured in a grid, cloud, or other distributed computing system that executes then automated model development tool 102.

The automated model development server 104 can include a processor 1802 that is communicatively coupled to a memory 1804 and that performs one or more of executing computer-executable program instructions stored in the memory 1804 and accessing information stored in the memory 1804. The processor 1802 can include one or more microprocessors, one or more application-specific integrated circuits, one or more state machines, or one or more other suitable processing devices. The processor 1802 can include any of a number of processing devices, including one. The processor 1802 can include or may be in communication with a memory 1804 that stores program code. When executed by the processor 1802, the program code causes the processor to perform the operations described herein.

The memory 1804 can include any suitable computer-readable medium. The computer-readable medium can include any electronic, optical, magnetic, or other storage device capable of providing a processor with computer-readable program code. Non-limiting examples of a computer-readable medium include a CD-ROM, DVD, magnetic disk, memory chip, ROM, RAM, an ASIC, a configured processor, optical storage, magnetic tape or other magnetic storage, or any other medium from which a computer processor can read instructions. The program code may include processor-specific instructions generated by a compiler or an interpreter from code written in any suitable computer-programming language, including, for example, C, C++, C#, Visual Basic, Java, Python, Perl, JavaScript, ActionScript, and PMML.

The automated model development server 104 may also include, or be communicatively coupled with, a number of external or internal devices, such as input or output devices. For example, the automated model development server 104 is shown with an input/output ("I/O") interface 1808 that can receive input from input devices or provide output to output devices. A bus 1806 can also be included in the automated model development server 104. The bus 1806 can communicatively couple one or more components of the automated model development server 104.

The automated model development server 104 can execute program code for the automated model development tool 102. The program code for the automated model development tool 102 may be resident in any suitable computer-readable medium and may be executed on any suitable processing device. The program code for the automated model development tool 102 can reside in the memory 1804 at the automated model development server 104. The automated model development tool 102 stored in the memory 1804 can configure the processor 1802 to perform the operations described herein.

The automated model development server 104 can also include at least one network interface 1810 for communicating with the network 110. The network interface 1810 can include any device or group of devices suitable for establishing a wired or wireless data connection to one or more networks 110. Non-limiting examples of the network interface 1810 include an Ethernet network adapter, a modem, or any other suitable communication device for accessing a network 110. Examples of a network 110 include the Internet, a personal area network, a local area network ("LAN"), a wide area network ("WAN"), or a wireless local area network ("WLAN"). A wireless network may include a wireless interface or combination of wireless interfaces. As an example, a network in the one or more networks 110 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 110. The network 110 can be incorporated entirely within or can include an intranet, an extranet, or a combination thereof. In one example, communications between two or more systems or devices in the computing environment 100 can be achieved by a secure communications protocol, such as secure sockets layer ("SSL") or transport layer security (TLS). In addition, data or transactional details may be encrypted.

Various implementations of the systems, methods, and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems, methods, and techniques described here may be implemented on a computer having a display device (e.g., a CRT (cathode ray tube) or LCD (liquid crystal display) monitor) for displaying information to the user, a keyboard, or a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The foregoing description of the examples, including illustrated examples, has been presented only for the purpose of illustration and description and is not intended to be exhaustive or to limit the subject matter to the precise forms disclosed. Numerous modifications, adaptations, and uses thereof will be apparent to those skilled in the art without departing from the scope of this disclosure. The illustrative examples described above are given to introduce the reader to the general subject matter discussed here and are not intended to limit the scope of the disclosed concepts.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the operations presented in the examples above can be varied. For example, operations can be re-ordered, combined, broken into sub-blocks, or some combination thereof. Certain operations or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

While the present subject matter has been described in detail with respect to specific aspects and features thereof, it will be appreciated that those skilled in the art, upon attaining an understanding of the foregoing may readily produce alterations to, variations of, and equivalents to such aspects and features. Each of the disclosed aspects, examples, and features can be combined with one or more of the other disclosed aspects, examples, and features. Accordingly, it should be understood that the present disclosure has been presented for purposes of example rather than limitation, and does not preclude inclusion of such modifications, variations, or additions to the present subject matter as would be readily apparent to one of ordinary skill in the art.

The invention claimed is:

1. A system comprising:
a processing device; and
a memory device communicatively coupled to the processing device, the processing device being configured to execute instructions stored in the memory device to cause the processing device to:
receive a data set including a plurality of predictor variables;
determine a type of a predictor variable in the plurality of predictor variables for selecting a parameter for developing an analytical model using the data set, wherein the type of the predictor variable includes a numeric type or a character type;
increase a predictive strength of at least some of the predictor variables having the determined type by combining data associated with at least some of the predictor variables based on a similarity between the data, wherein combining data associated with at least some of the predictor variables based on the similarity between the data comprises:
(a) grouping (i) a first set of data values for a predictor variable into a first bin, (ii) a second set of data values for the predictor variable into a second bin, and (ii) a third set of data values for the predictor variable into a third bin,
(b) accessing a first odds index computed from the first set of data values, a second odds index computed from the second set of data values, and a third odds index computed from the third set of data values,
(c) determining that a sign and magnitude of the first odds index is closer to a sign and magnitude of the second odds index than to a sign and magnitude of the third odds index, and
(d) combining the first bin with the second bin rather than the third bin based on the sign and magnitude of the first odds index being closer to the sign and magnitude of the second odds index;
reduce a number of predictor variables in the data set by selecting a subset of the predictor variables based on a respective predictive strength of each predictor variable in the subset; and
develop the analytical model based on the combined data of the selected subset of the predictor variables, wherein the analytical model is usable to determine a relationship between the plurality of predictor variables and an output variable.

2. The system of claim 1, wherein the processing device is further configured to:
receive an additional data set describing a plurality of entities associated with the plurality of predictor variables;
divide the additional data set based on a characteristic of the plurality of entities; and
determine the relationship between the plurality of predictor variables and the output variable using the analytical model, wherein each predictor variable corresponds to a transaction associated with an entity in the plurality of entities and the output variable indicates a likelihood of the entity performing a task or satisfying a criterion.

3. The system of claim 1, wherein the processing device is configured to select the subset of the predictor variables by performing operations comprising:
selecting a plurality of predictive models;
applying at least some of the predictor variables in the data set to the plurality of predictive models to determine a degree to which each predictive model accurately predicts output variables based on the predictor variables;
selecting a predictive model in the plurality of predictive models based on the predictive model having a threshold level of accuracy;
determining the respective predictive strength of each predictor variable using the predictive model; and
removing predictor variables having a predictive strength below a threshold predictive strength from the data set to reduce the number of predictor variables in the data set, and wherein a portion of the data set used to automatically develop the analytical model includes the predictor variables having the threshold predictive strength.

4. The system of claim 3, wherein the processing device is configured to reduce a sparsity of the data set by performing operations comprising:
determining a missing amount of values associated with each predictor variable in the plurality of predictor variables;
removing each predictor variable having a respective missing amount of values above a missing value threshold from the data set;
receiving an outlier threshold value;
removing a predictor variable from the data set based on data associated with the predictor variable being above or below the outlier threshold value; and
wherein the processing device is configured to develop the analytical model using the data set having the reduced sparsity.

5. The system of claim 1, wherein the processing device is configured to combine the data by performing operations comprising:
calculating values of output variables associated with at least some of the predictor variables;
comparing the values of the output variables to a threshold degree of similarity between the values; and
combining the data associated with the predictor variables based on the values of the output variables associated with the predictor variables exceeding the threshold degree of similarity to create a monotonic sequence for developing the analytical model.

6. The system of claim 1, wherein the processing device is configured to:
classify each of the predictor variables based on the type of each of the predictor variables;
output data indicating the type of each predictor variable and a class of each predictor variable; and
select the parameter of the analytical model based at least in part on the class or the type of the predictor variable.

7. The system of claim 1, wherein the processing device is configured to determine the respective predictive strength of each predictor variable by performing operations comprising:
   determining a characteristic of a predictor variable, the characteristic including an odds index, wherein the processing device is configured to determine the odds index based on a ratio between positive outcomes and negative outcomes associated with the predictor variable, wherein the odds index indicates a correlation between the predictor variable and a positive or negative outcome;
   identifying a bivariate relationship associated with the predictor variable based on the characteristic of the predictor variable; and
   determining the predictive strength of the predictor variable based on the bivariate relationship, wherein the predictive strength indicates an extent to which the predictor variable can be used to predict the positive or negative outcome.

8. A method comprising:
   receiving, by a processing device, a data set including a plurality of predictor variables;
   determining, by the processing device, a type of a predictor variable in the plurality of predictor variables for selecting a parameter for developing an analytical model using the data set, wherein the type of the predictor variable includes a numeric type or a character type;
   increasing, by the processing device, a predictive strength of at least some of the predictor variables having the determined type by combining data associated with at least some of the predictor variables based on a similarity between the data, wherein combining data associated with at least some of the predictor variables based on the similarity between the data comprises:
      (a) grouping (i) a first set of data values for a predictor variable into a first bin, (ii) a second set of data values for the predictor variable into a second bin, and (ii) a third set of data values for the predictor variable into a third bin,
      (b) accessing a first odds index computed from the first set of data values, a second odds index computed from the second set of data values, and a third odds index computed from the third set of data values,
      (c) computing a first difference by subtracting the first odds index from the second odds index,
      (d) computing a second difference by subtracting the first odds index from the third odds index, and
      (e) combining the first bin with the second bin rather than the third bin based on the first difference being smaller than the second difference;
   reducing, by the processing device, a number of predictor variables in the data set by selecting a subset of the predictor variables based on a respective predictive strength of each predictor variable in the subset; and
   developing, by the processing device, the analytical model based on the combined data of the selected subset of the predictor variables, wherein the analytical model is usable to determine a relationship between the plurality of predictor variables and an output variable.

9. The method of claim 8, further comprising:
   receiving, by the processing device, an additional data set describing a plurality of entities associated with the plurality of predictor variables;
   dividing, by the processing device, the additional data set based on a characteristic of the plurality of entities; and
   determining, by the processing device, the relationship between the plurality of predictor variables and the output variable using the analytical model, wherein each predictor variable corresponds to a transaction associated with an entity in the plurality of entities and the output variable indicates a likelihood of the entity performing a task or satisfying a criterion.

10. The method of claim 8, wherein selecting the subset of the predictor variables based on the respective predictive strength of each predictor variable in the subset includes:
   selecting, by the processing device, a plurality of predictive models;
   applying, by the processing device, at least some of the predictor variables in the data set to the plurality of predictive models to determine a degree to which each predictive model accurately predicts output variables based on the predictor variables;
   selecting, by the processing device, a predictive model in the plurality of predictive models based on the predictive model having a threshold level of accuracy;
   determining, by the processing device, the respective predictive strength of each predictor variable using the predictive model; and
   removing, by the processing device, predictor variables having a predictive strength below a threshold predictive strength from the data set to reduce the number of predictor variables in the data set, and wherein a portion of the data set used to automatically develop the analytical model includes the predictor variables having the threshold predictive strength.

11. The method of claim 8, wherein combining data associated with at least some of the predictor variables based on the similarity between the data includes:
   calculating, by the processing device, values of output variables associated with at least some of the predictor variables;
   comparing, by the processing device, the values of the output variables to a threshold degree of similarity between the values; and
   combining, by the processing device, the data associated with the predictor variables based on the values of the output variables associated with the predictor variables exceeding the threshold degree of similarity to create a monotonic sequence for developing the analytical model.

12. The method of claim 8, wherein selecting the parameter for developing the analytical model using the data set includes:
   classifying, by the processing device, each of the predictor variables based on the type of each of the predictor variables;
   outputting, by the processing device, data indicating the type of each predictor variable and a class of each predictor variable; and
   selecting, by the processing device, the parameter of the analytical model based at least in part on the class or the type of the predictor variable.

13. The method of claim 8, further comprising:
   determining, by the processing device, the respective predictive strength of each predictor variable, wherein determining the respective predictive strength of each predictor variable includes:
      determining, by the processing device, a characteristic of a predictor variable, the characteristic including an odds index, wherein the processing device is configured to determine the odds index based on a ratio between positive outcomes and negative outcomes associated with the predictor variable, wherein the odds index indicates a correlation between the predictor variable and a positive or negative outcome;

identifying, by the processing device, a bivariate relationship associated with the predictor variable based on the characteristic of the predictor variable; and determining the predictive strength of the predictor variable based on the bivariate relationship, wherein the predictive strength indicates an extent to which the predictor variable can be used to predict the positive or negative outcome.

14. The method of claim 8, further comprising reducing a sparsity of the data set, wherein reducing the sparsity of the data set includes:

determining, by the processing device, a missing amount of values associated with each predictor variable in the plurality of predictor variables;

removing, by the processing device, each predictor variable having a respective missing amount of values above a missing value threshold from the data set;

receiving, by the processing device, an outlier threshold value;

removing, by the processing device, a predictor variable from the data set based on data associated with the predictor variable being above or below the outlier threshold value; and developing, by the processing device, the analytical model using the data set having the reduced sparsity.

15. The method of claim 8, further comprising:

computing the first odds index by at least:

determining that a first percentage or amount of positive outcomes associated with the first set of data values is greater than a first percentage or amount of negative outcomes associated with the first set of data values;

applying, based on the first percentage or amount of positive outcomes being greater than the first percentage or amount of negative outcomes, a positive sign to a first ratio that is computed by dividing the first percentage or amount of positive outcomes by the first percentage or amount of negative outcomes; and computing one or more of the second odds index and the third odds index by at least:

determining that a second percentage or amount of positive outcomes associated with the second set of data values is less than a second percentage or amount of negative outcomes associated with the second set of data values;

applying, based on the second percentage or amount of positive outcomes being less than the second percentage or amount of negative outcomes, a negative sign to a second ratio that is computed by dividing the second percentage or amount of negative outcomes by the second percentage or amount of positive outcomes.

16. The method of claim 8, further comprising:

accessing odds indices for respective bins of a predictor variable;

computing odds index differentials for the bins of the predictor variable, wherein each odds index differential comprises a difference between a pair of odds indices for a respective pair of adjacent bins;

detecting:

(a) a first change in which a positive sign for a first one of the odds index differentials is followed by a negative sign for a second one of the odds index differentials, and (b) a second change in which a negative sign for a third one of the odds index differentials is followed by a positive sign for a fourth one of the odds index differentials; and combining a subset of the bins based on detecting the first change and the second change, wherein combining the subset of the bins increases a monotonicity of the predictor variable with respect to the output variable.

17. The method of claim 8, wherein reducing the number of predictor variables in the data set comprises removing a first predictor variable having a correlation with second predictor variable, wherein the correlation causes the output variable to have a first sign when the analytical model is built from the first and second predictor variables and a removal of the first predictor variable causes the output variable to have a second sign different from the first sign when the analytical model is built from the reduced number of predictor variables.

18. A non-transitory computer-readable storage medium having program code that is executable by a processor device to cause a computing device to perform operations, the operations comprising:

receiving a data set including a plurality of predictor variables;

determining a type of a predictor variable in the plurality of predictor variables for selecting a parameter for developing an analytical model using the data set, wherein the type of the predictor variable includes a numeric type or a character type;

increasing a predictive strength of at least some of the predictor variables having the determined type by combining data associated with at least some of the predictor variables, wherein combining the data associated with at least some of the predictor variables comprises:

accessing odds indices for respective bins of a predictor variable;

computing odds index differentials for the bins of the predictor variable, wherein each odds index differential comprises a difference between a pair of odds indices for a respective pair of adjacent bins;

detecting:

(a) a first change in which a positive sign for a first one of the odds index differentials is followed by a negative sign for a second one of the odds index differentials, and (b) a second change in which a negative sign for a third one of the odds index differentials is followed by a positive sign for a fourth one of the odds index differentials; and combining a subset of the bins based on detecting the first change and the second change; and developing the analytical model based on the combined data, wherein the analytical model is usable to determine a relationship between the plurality of predictor variables and an output variable, wherein combining the subset of the bins based on detecting the first change and the second change increases a monotonicity of the predictor variable with respect to the output variable.

19. The non-transitory computer-readable storage medium of claim 18, further comprising program code to cause the computing device to perform the operations of:

receiving an additional data set describing a plurality of entities associated with the plurality of predictor variables;

dividing the additional data set based on a characteristic of the plurality of entities; and determining the relationship between the plurality of predictor variables and the output variable using the analytical model, wherein each predictor variable corresponds to a transaction associated with an entity in the plurality of entities and the output variable indicates a likelihood of the entity performing a task or satisfying a criterion.

20. The non-transitory computer-readable storage medium of claim 18, the operations further comprising selecting a subset of the predictor variables based on a respective predictive strength of each predictor variable in the subset includes:

selecting a plurality of predictive models;

applying the plurality of predictive models to at least some of the predictor variables in the data set to determine a degree to which each predictive model accurately predicts output variables based on the predictor variables;

selecting a predictive model in the plurality of predictive models based on the predictive model having a threshold level of accuracy;

determining the respective predictive strength of each predictor variable using the predictive model;

removing predictor variables having a predictive strength below a threshold predictive strength from the data set to reduce a number of predictor variables in the data set, and wherein a portion of the data set used to automatically develop the analytical model includes the predictor variables having the threshold predictive strength; and removing a first predictor variable having a correlation with second predictor variable, wherein:

the analytical model is developed based on the selected subset of the predictor variables, and reducing the number of predictor variables in the data set further comprises, wherein the correlation causes the output variable to have a first sign when the analytical model is built from the first and second predictor variables and a removal of the first predictor variable causes the output variable to have a second sign different from the first sign when the analytical model is built from the reduced number of predictor variables.

* * * * *